US011722722B2

(12) United States Patent
Lee et al.

(10) Patent No.: US 11,722,722 B2
(45) Date of Patent: Aug. 8, 2023

(54) DISPLAY APPARATUS AND CONTROL METHOD THEREOF

(71) Applicant: SAMSUNG ELECTRONICS CO., LTD., Suwon-si (KR)

(72) Inventors: Myungho Lee, Suwon-si (KR); Dukwoo Kim, Suwon-si (KR); Kwansik Yang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/674,642

(22) Filed: Nov. 5, 2019

(65) Prior Publication Data

US 2020/0145602 A1     May 7, 2020

(30) Foreign Application Priority Data

Nov. 7, 2018 (KR) .......................... 10-2018-0135625

(51) Int. Cl.
*H04N 5/44* (2011.01)
*G06K 9/00* (2022.01)
(Continued)

(52) U.S. Cl.
CPC ..... *H04N 21/42204* (2013.01); *G06F 3/0481* (2013.01); *G06F 3/0487* (2013.01);
(Continued)

(58) Field of Classification Search
CPC ............. H04N 5/4403; H04N 21/4126; H04N 21/4222; H04N 2005/441;
(Continued)

(56) References Cited

U.S. PATENT DOCUMENTS 9,640,043 B1 * 5/2017 Dockrey ................. H04W 4/80
9,716,774 B2    7/2017 Brodersen et al.
(Continued)

FOREIGN PATENT DOCUMENTS

EP    3016397 A1    5/2016
EP    3141986 A2    3/2017
(Continued)

OTHER PUBLICATIONS

Communication dated Mar. 18, 2020 from the European Patent Office in application No. 19206663.7.
(Continued)

*Primary Examiner* — Tadesse Hailu
*Assistant Examiner* — Darrin Hope
(74) *Attorney, Agent, or Firm* — Sughrue Mion, PLLC

(57) ABSTRACT

Disclosed is a display apparatus including: a display; a communicator; a storage; and a processor configured to obtain state information about one or more electronic apparatuses, select a first electronic apparatus, among the one or more electronic apparatuses, based on the obtained state information of the first electronic apparatus satisfying a predetermined criteria, transmit a connection request signal to the first electronic apparatus through the communicator along with information about a function to be performed by the display apparatus based on a user input, connect with the first electronic apparatus and receive a user input from the first electronic apparatus through the communicator, and execute the function based on the received user input.

18 Claims, 24 Drawing Sheets

(51) Int. Cl.
    *G06F 3/0487*     (2013.01)
    *G06F 3/0481*     (2022.01)
    *H04N 21/422*     (2011.01)
    *G06V 40/10*     (2022.01)
    *H04N 21/41*     (2011.01)

(52) U.S. Cl.
    CPC ....... *G06V 40/10* (2022.01); *H04N 21/41265* (2020.08); *H04N 21/4222* (2013.01); *H04N 21/42209* (2013.01)

(58) Field of Classification Search
    CPC ........ H04N 21/42204; H04N 21/42209; G06F 3/0481; G06F 3/0487; G06K 9/00362
    USPC ......................................................... 715/734
    See application file for complete search history.

(56) References Cited

U.S. PATENT DOCUMENTS

| | | |
|---|---|---|
| 9,753,603 B2 | 9/2017 | Lee |
| 2010/0011299 A1 | 1/2010 | Brodersen et al. |
| 2011/0084919 A1 | 4/2011 | Lee |
| 2011/0254683 A1* | 10/2011 | Soldan ............ H04N 21/43615 340/539.13 |
| 2013/0267219 A1 | 10/2013 | Ito et al. |
| 2014/0136986 A1 | 5/2014 | Martin et al. |
| 2014/0191960 A1 | 7/2014 | Jeong et al. |
| 2015/0350146 A1* | 12/2015 | Cary ........................ H04L 51/14 709/206 |
| 2016/0124537 A1* | 5/2016 | Kim .......................... G06F 3/14 345/173 |
| 2017/0075641 A1* | 3/2017 | Kwon ................... G06F 3/0227 |
| 2017/0115949 A1 | 4/2017 | Kim et al. |
| 2017/0205899 A1 | 7/2017 | Hyodo et al. |
| 2017/0277498 A1* | 9/2017 | Wood, Jr. ................ G06F 3/033 |
| 2018/0061220 A1* | 3/2018 | Greene ............. G06K 9/00771 |
| 2018/0253332 A1* | 9/2018 | Andrianov .......... H04L 12/4641 |

FOREIGN PATENT DOCUMENTS

| | | |
|---|---|---|
| KR | 101649162 B1 | 8/2016 |
| WO | 2018145641 A1 | 8/2018 |

OTHER PUBLICATIONS

International Search Report (PCT/ISA/210) and Written Opinion (PCT/ISA/237) dated Feb. 26, 2020 from the International Searching Authority in counterpart application No. PCT/KR2019/014722.
Communication dated Apr. 13, 2021 issued by the European Intellectual Property Office in counterpart European Application No. 19 206 663.7.
Communication dated Feb. 8, 2022, issued by the India Intellectual Property Office in Indian Patent Application No. 202117017404.

* cited by examiner

DISPLAY APPARATUS AND CONTROL METHOD THEREOF

CROSS-REFERENCE TO RELATED THE APPLICATION(S)

The application is based on and claims priority under 35 U.S.C. § 119 to Korean Patent Application No. 10-2018-0135625 filed on Nov. 7, 2018 in the Korean Intellectual Property Office, the disclosure of which is incorporated by reference herein in its entirety.

BACKGROUND

Field

The disclosure relates to a display apparatus and a control method thereof, and more particularly to a display apparatus, which request connection with an electronic apparatus, and a control method thereof.

Description of the Related Art

When a display apparatus, such as a television (TV) is used as a display screen and is located at a distance from a user it is inconvenient for the user when there is a need to input a longer character string.

To solve this, there has been proposed technology of using an electronic apparatus outside the display apparatus as an input device for the display apparatus. For example, there has been proposed technology of using a smartphone of a user as an input device for the TV.

However, a related art technique for using a user's smartphone as an input device for a TV requires a complicated setting process and takes a long time to execute a specific application, search for peripheral apparatuses, select a TV desired for connection among the found peripheral apparatuses, and so on. Therefore, technology is required to automatically connect the display apparatus and the electronic apparatus.

However, when many electronic apparatuses are present around the display apparatus, it is difficult to identify which one of the electronic apparatuses is suitable for connection.

SUMMARY

Accordingly, an aspect of the disclosure is to provide a display apparatus that automatically makes a request for connection to an electronic apparatus suitable to receive a user input among many electronic apparatuses present around the display apparatus.

According to an aspect of the disclosure, there is provided a display apparatus comprising: a display; a communicator; a storage; and a processor configured to: obtain state information about one or more electronic apparatuses, select a first electronic apparatus, among the one or more electronic apparatuses, based on the obtained state information of the first electronic apparatus satisfying a predetermined criteria, transmit a connection request signal to the first electronic apparatus through the communicator along with information about a function to be performed by the display apparatus based on a user input, connect with the first electronic apparatus and receive a user input from the first electronic apparatus through the communicator, and execute the function based on the received user input.

The predetermined criteria may comprise one of an apparatus currently used by a user of the display apparatus or an apparatus which is close to the user.

The state information may comprise an operation state of a screen in the one or more electronic apparatuses.

The state information may comprise time information indicating a time or a duration related to movement of the one or more electronic apparatuses detected by a sensor of the one or more electronic apparatuses.

The processor may be further configured to select the first electronic apparatus based on a distance between the display apparatus and the first electronic apparatus.

The processor may be further configured to select the first electronic apparatus based on a distance between a remote controller for controlling the display apparatus and the first electronic apparatus.

The processor may be configured to identify the distance based on strength of a signal received from the first electronic apparatus through the communicator and information included in the signal The processor may be configured to identify a user, and select the first electronic apparatus corresponding to the identified user.

The processor may be configured to identify the user based on login information to the display apparatus.

The processor may be configured to identify the user based on a captured image.

The processor may be further configured to display a user interface (UI) comprising a text input box on the display, and receive the user input from the first electronic apparatus while displaying the UI.

The processor may be further configured to transmit the connection request signal to a plurality of electronic apparatuses, among the one or more electronic apparatuses, and transmit a connection request canceling signal to remaining electronic apparatuses other than the first electronic apparatus based on the first electronic apparatus being connected to the display apparatus.

The processor may be further configured to transmit a connection request canceling signal to the first electronic apparatus to which the connection request signal is transmitted, based on termination of an event requiring the display apparatus to transmit the connection request signal to the first electronic apparatus.

The display apparatus may further comprise a second communicator configured to communicate with a server, wherein the processor may be configured to obtain the state information of the one or more electronic apparatuses from the server through the second communicator.

According to another aspect of the disclosure, there is provided an electronic apparatus comprising: a display; a communicator; and a processor configured to: receive a connection request signal from a display apparatus along with information about a function to be performed by the display apparatus based on a user input, receive a user input accepting a connection request through an user interface of the electronic apparatus, display a screen based on the received information about the function on the display, and receive the user input based on the displayed screen and transmit the user input to the display apparatus.

The processor may be further configured to transmit the state information of the electronic apparatus to the display apparatus or a server.

The processor may be further configured to display a screen on the display based on the received information about the function while the electronic apparatus is in a locked.

According to another aspect of the disclosure, there is provided a method of controlling a display apparatus, comprising: obtaining state information about one or more electronic apparatuses; selecting a first electronic apparatus, among the one or more electronic apparatuses, based on the obtained state information of the first electronic apparatus satisfying a predetermined criteria; transmitting a connection request signal, through a communicator of the display apparatus, to the first electronic apparatus through the communicator along with information about a function to be performed by the display apparatus based on a user input;

connecting with the first electronic apparatus and receive a user input from the first electronic apparatus through the communicator; and executing the function based on the received user input.

The state information may comprise an operation state of a screen in the electronic apparatus.

According to another aspect of the disclosure, there is provided a method of controlling an electronic apparatus, comprising: receiving a connection request signal from a display apparatus along with information about a function to be performed by the display apparatus based on a user input; receiving a user input accepting a connection request through an user interface of the electronic apparatus; displaying a screen based on the received information about the function on the display; and receiving the user input based on the displayed screen and transmit the user input to the display apparatus.

According to another aspect of the disclosure, there is provided an apparatus comprising: a memory storing one or more instructions; and a processor configured to execute the one or more instructions to: obtain information about one or more electronic devices in the vicinity of the apparatus, the information indicating a status of each of the one or more electronic devices, identify a first electronic device, among the one or more electronic devices, based on the obtained information of the first electronic device satisfying a predetermined criteria, and transmit a connection request signal to the first electronic device.

The processor may be further configured to: connect with the first device based on receiving an acceptance signal corresponding to the connection request signal; transmit information about a function to be performed by the display apparatus to the first electronic device; receive a user input corresponding to the function; and execute the function based on the received user input.

The processor may be further configured to: identify a second electronic device, among the one or more electronic devices, based on the obtained information of the second electronic device satisfying a predetermined criteria, when an acceptance signal corresponding to the connection request signal is not received from the first electronic device.

The information about one or more electronic devices may comprise one of an identification information, operation state information, movement information, position information or user identification information.

According to another aspect of the disclosure, there is provided a method performed by an apparatus comprising: obtaining information about one or more electronic devices in the vicinity of the apparatus, the information indicating a status of each of the one or more electronic devices; identifying a first electronic device, among the one or more electronic devices, based on the obtained information of the first electronic device satisfying a predetermined criteria; and transmitting a connection request signal to the first electronic device.

The method may further comprise: connecting with the first device apparatus based on receiving an acceptance signal corresponding to the connection request signal; transmitting information about a function to be performed by the display apparatus to the first electronic device; receiving a user input corresponding to the function; and executing the function based on the received user input.

The method may further comprise: identifying a second electronic device, among the one or more electronic devices, based on the obtained information of the second electronic device satisfying a predetermined criteria, when an acceptance signal corresponding to the connection request signal is not received from the first electronic device.

The information about one or more electronic devices may comprise one of an identification information, operation state information, movement information, position information or user identification information.

BRIEF DESCRIPTION OF THE DRAWINGS

The above and/or other aspects, features, and advantages of certain embodiments of the disclosure will become apparent and more readily appreciated from the following description, taken in conjunction with the accompanying drawings, in which.

DETAILED DESCRIPTION OF EMBODIMENTS

Figure 1:
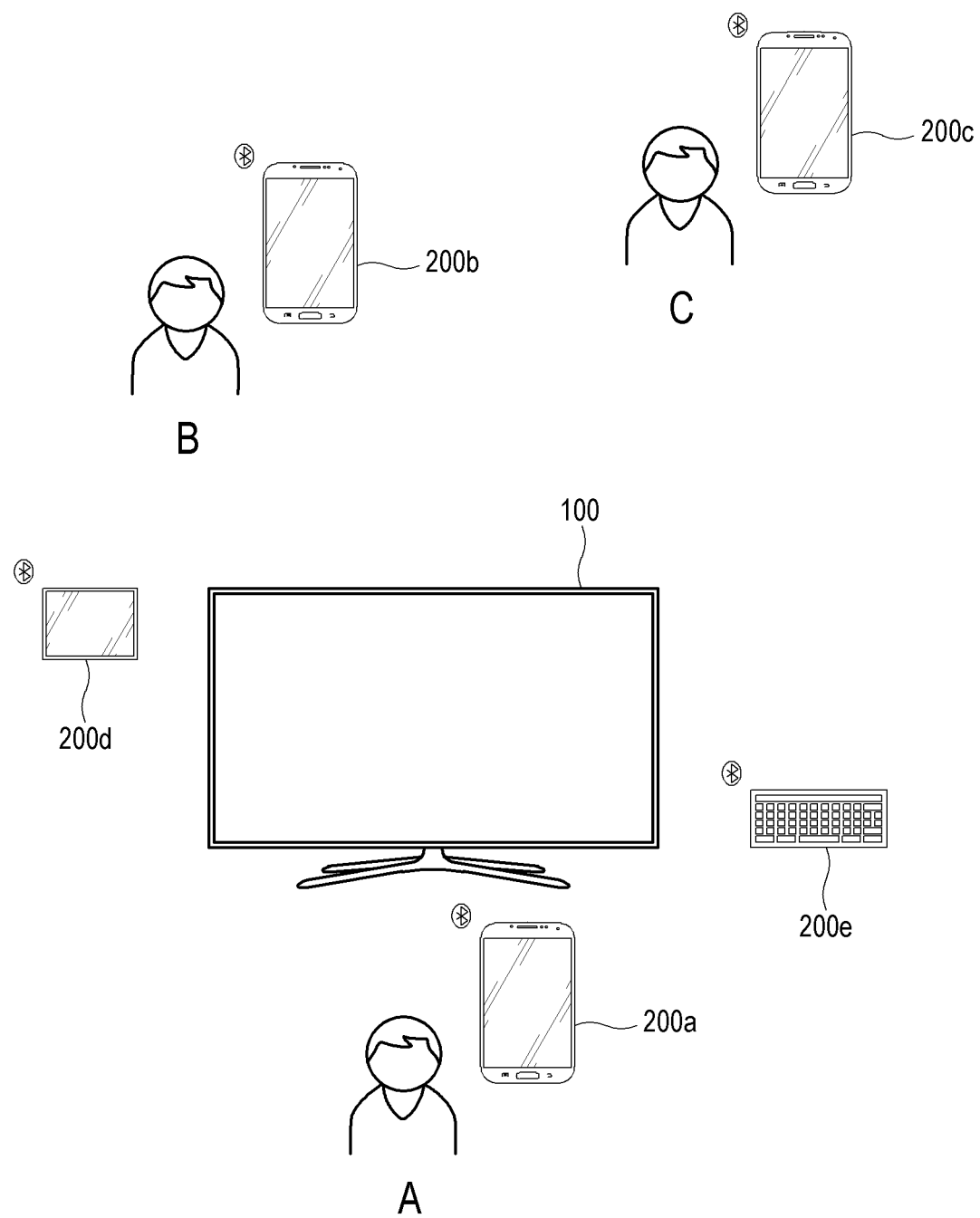
FIG. 1 is a schematic view of a system including a display apparatus according to an embodiment of the disclosure.

Below, embodiments will be described in detail with reference to accompanying drawings. In the drawings, like numerals or symbols refer to like elements having substantially the same function, and the size of each element may be exaggerated for clarity and convenience of description. However, the configurations and functions illustrated in the following embodiments are not construed as limiting the disclosure and the key configurations and functions. In the following descriptions, details about publicly known functions or features will be omitted if it is determined that they cloud the gist of the disclosure.

In the following embodiments, terms 'first', 'second', etc. are only used to distinguish one element from another, and singular forms are intended to include plural forms unless otherwise mentioned contextually. In the following embodiments, it will be understood that terms 'comprise', 'include', 'have', etc. do not preclude the presence or addition of one or more other features, numbers, steps, operations, elements, components or combination thereof. In addition, a 'module' or a 'portion' may perform at least one function or operation, be achieved by hardware, software or combination of hardware and software, and be modularized into at least one processor. Further, in the following embodiments, at least one among a plurality of elements refers to not only all of the plurality of elements but also each element among the plurality of elements excluding the other elements or a combination thereof. Further, the expression of "configured to (or set to)" may for example be replaced with "suitable for," "having the capacity to," "designed to," "adapted to," "made to," or "capable of" according to circumstances. Also, the expression of "configured to (or set to)" may not necessarily refer to only "specifically designed to" in terms of hardware. Instead, the "device configured to" may refer to "capable of" along with other devices or parts in a certain circumstance. For example, the phrase of "the processor configured to perform A, B, and C" may refer to a dedicated processor (e.g. an embedded processor) for performing the corresponding operations, or a generic-purpose processor (e.g. a central processing unit (CPU) or an application processor) for performing the corresponding operations by executing one or more software programs stored in a memory device.

FIG. 1 illustrates a display apparatus 100 according to an embodiment of the disclosure. The display apparatus 100 according to an embodiment of the disclosure may be actualized by a television (TV). Further, the display apparatus 100 according to another embodiment of the disclosure may be actualized by an electronic frame, a digital billboard, a large format display (LFD), a digital signage, a smartphone, a tablet computer, a mobile phone, a smartwatch, a head-mounted display or the like wearable device, a computer, a multimedia player, a set-top box, a smart refrigerator, or the like apparatus capable of outputting an image based content. However, the display apparatus 100 according to an embodiment of the disclosure is not limited to these examples, but may include any apparatus capable of displaying an image.

The display apparatus 100 according to an embodiment of the disclosure may make a request for connection to an electronic apparatus 200 positioned outside the display apparatus 100. The electronic apparatus 200, to which the display apparatus 100 can make a request for connection, may for example be actualized by a smartphone (200a, 200b or 200c), a mobile phone, a tablet computer (200d), a keyboard (200e), and a mouse. However, the electronic apparatus 200 may not be limited to these examples, but be actualized by any apparatus that can be connected to the display apparatus 100.

There are no specific limits to a user of the electronic apparatus 200. For example, when there are a plurality of electronic apparatuses 200a, 200b, 200c, 200d, and 200e, the electronic apparatuses may be employed by different users, the electronic apparatuses may be employed by one user, or some electronic apparatuses may be employed by a user A (200a) and other electronic apparatuses may be employed by a user B (200b) or C (200c).

There are no specific limits to a connection method between the display apparatus 100 and the electronic apparatus 200. For example, the display apparatus 100 and the electronic apparatus 200 may be connected by a communication method such as Bluetooth, Bluetooth low energy (BLE), Wi-Fi, Wi-Fi direct, near field communication (NFC), etc., but the connection method between two apparatuses is not limited to these examples.

Figure 2:
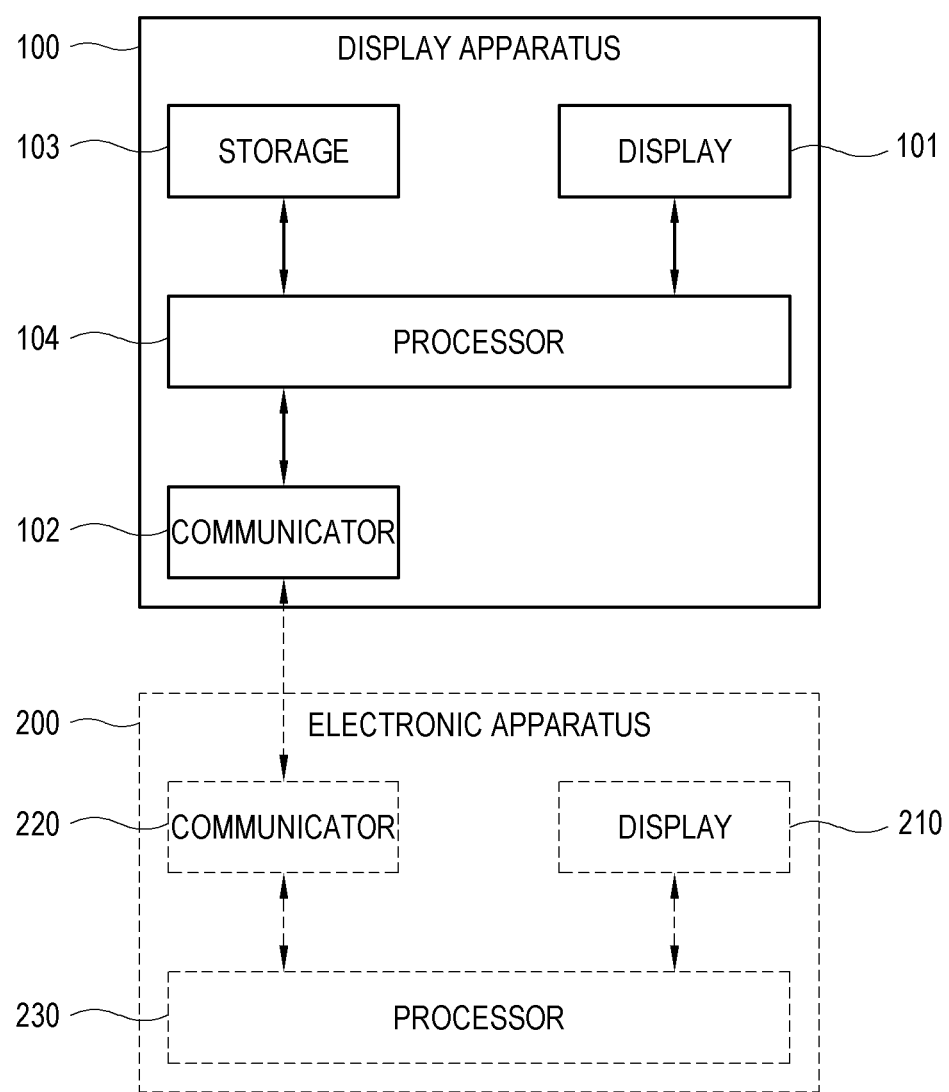
FIG. 2 is a block diagram of a display apparatus according to an embodiment of the disclosure.

FIG. 2 is a block diagram of a display apparatus 100 according to an embodiment of the disclosure. The display apparatus 100 according to an embodiment of the disclosure includes a display 101, a communicator 102, a storage 103 and a processor 104. However, the configuration of the display apparatus 100 shown in FIG. 2 is merely an example, and the display apparatus 100 according to an embodiment of the disclosure may be actualized to have another configuration. In other words, the display apparatus 100 according to an embodiment of the disclosure may be actualized including other elements in addition to the elements shown in FIG. 2, or excluding some elements shown in FIG. 2. According to an embodiment of the disclosure, the configurations may include at least one of hardware and/or software, and may be actualized by a circuit or a chip.

The display 101 may display an image. The display 101 may for example be actualized by various display types such as liquid crystal, plasma, a light emitting diode (LED), an organic light emitting diode (OLED), a surface-conduction electron-emitter, a carbon nano-tube, nano-crystal, etc. without limitations. When the type of the display 101 is the liquid crystal, the display includes a liquid crystal display (LCD) panel, a backlight unit for emitting light to the LCD panel, a panel driver for driving the LCD panel, etc. Besides, the display 101 may be actualized by a self-emissive OLED panel without the backlight unit.

The communicator 102 may communicate with the electronic apparatus 200 or the like. The communicator 102 may perform wired or wireless communication. Therefore, the communicator 102 may be actualized by various other communication methods as well as a connection portion including a connector or terminal for wireless connection. For example, the communicator 102 may be configured to perform one or more communications among Wi-Fi, Wi-Fi direct, Ethernet, Bluetooth, Bluetooth low energy (BLE), serial port profile (SPP), ZigBee, infrared (IR) communication, radio control, ultra-wide band (UWB), wireless universal serial bus (USB), and near field communication (NFC). The communicator 102 may be actualized in the form of a device, a software (S/W) module, a hardware module, a circuit, a chip, etc.

The storage 103 is configured to store data such as state information of the electronic apparatus 200. The storage 103 is accessed by the processor 104, and performs reading, recording, modifying, deleting, updating, etc. with regard to the data. The storage 103 may include a nonvolatile memory such as a flash memory, a hard disc drive (HDD), a solid-state drive (SSD), or the like to retain data regardless of whether or not system power is supplied to the display apparatus 100. Further, the storage 103 may include a volatile memory such as a buffer, a random-access memory (RAM), or the like in which data to be processed by the processor 104 is temporarily loaded therein.

The processor 104 may process an image to be displayed on the display 101. There are no limits to the image processing and image processing process performed by the processor 104. The image processing performed in the processor 104 may for example include de-multiplexing to divide an input stream into sub streams such as video, audio and appended data, decoding corresponding to an image format of an image stream, de-interlacing to convert an interlaced-type image stream into a progressive-type one, scaling to adjust an image stream to have a preset resolution, noise reduction to improve image quality, detail enhancement, frame refresh rate conversion, etc.

The processor 104 may perform control to operate general elements of the display apparatus 100. The processor 104 may execute a control program (or instruction) to perform such control operation. In this case, the display apparatus 100 may further include a nonvolatile memory in which the control program is installed, a volatile memory to which at least a part of the installed control program is loaded. Further, such a control program may be stored in other electronic devices as well as the display apparatus 100.

The control program may include a program(s) actualized by at least one among a basic input/output system (BIOS), a device driver, an operating system, firmware, a platform, and an application program (or an application). According to an embodiment, the application program may be previously installed or stored in the display apparatus 100 when the display apparatus 100 is manufactured, or may be installed in the display apparatus 100 based on data of an application program received from the outside in the future when it is required to be used. The data of the application program may for example be downloaded from an external server such as an application market to the display apparatus 100, but not limited thereto. Meanwhile, the processor 104 may be actualized in the form of a device, a software (S/W) module, hardware module, a circuit, a chip, etc. or combination thereof. For convenience, the operation performed by executing the control program in the processor 104 according to an embodiment of the disclosure may be described below as the operation of the processor 104 without mentioning the control program.

The processor 104 may for example perform a process of obtaining the state information of the electronic apparatus 200, and control the storage 103 to store the obtained state information. The display apparatus 100 shown in FIG. 2 is actualized to include one processor 104 configured to perform both the process and the control, but this is merely an example. According to another embodiment of the disclosure, the display apparatus 100 may be actualized to additionally include a controller separately from the processor. According to another embodiment of the disclosure, the display apparatus 100 may be actualized to additionally include multiple processors for performing the process and the control operation.

The electronic apparatus 200 connectable with the display apparatus 100 according to an embodiment of the disclosure may include a display 210, a communicator 220, and a processor 230. The display 210, the communicator 220 and the processor 230 of the electronic apparatus 200 are equivalent to the display 101, the communicator 102 and the processor 104 of the display apparatus 100, and therefore detailed descriptions thereof will be omitted. According to an embodiment, the electronic apparatus 200 may not include a display 210.

Figure 3:
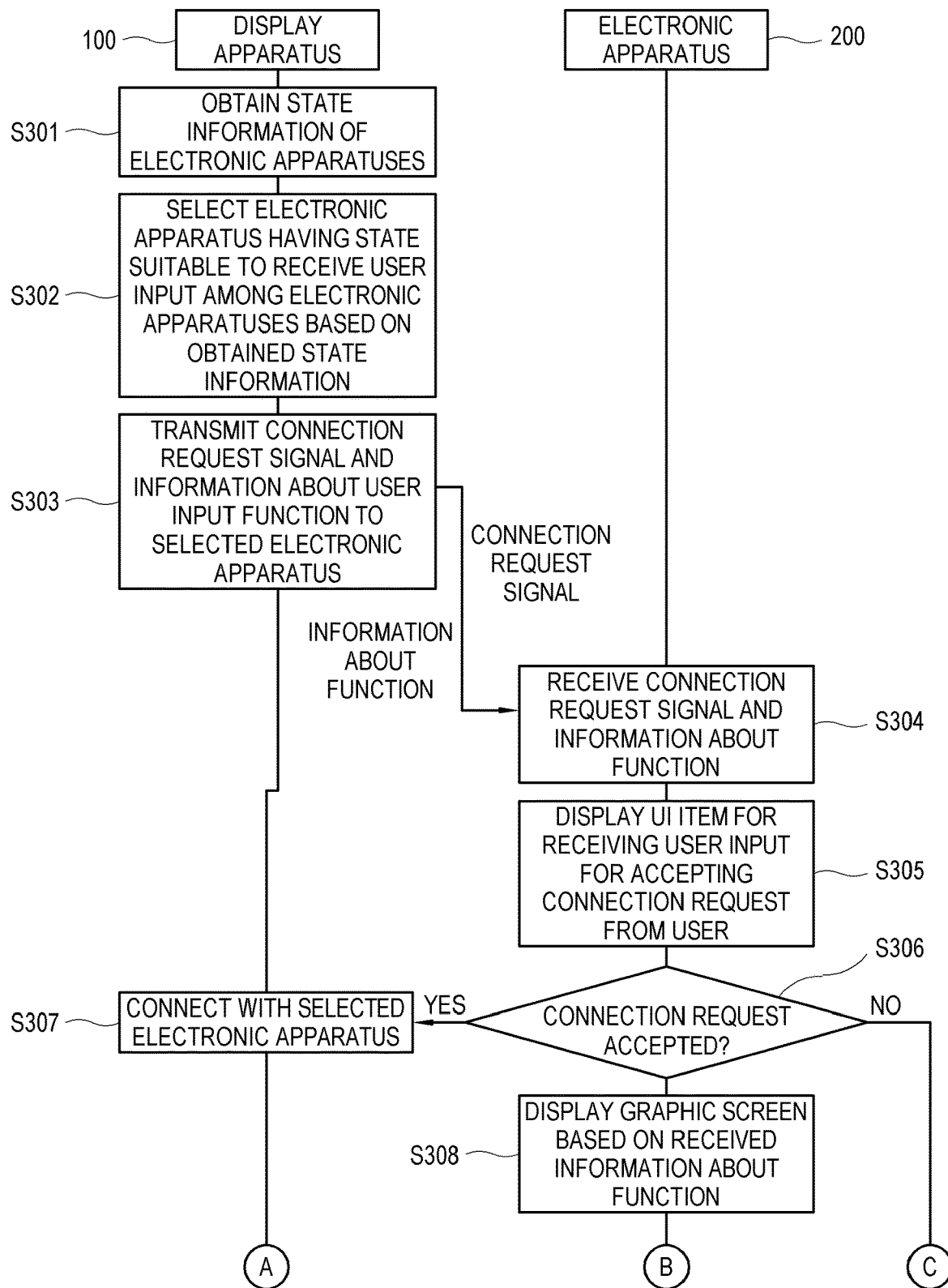
FIGS. 3 and 4 are flowcharts showing an operation of a display apparatus according to an embodiment of the disclosure.
Figure 4:
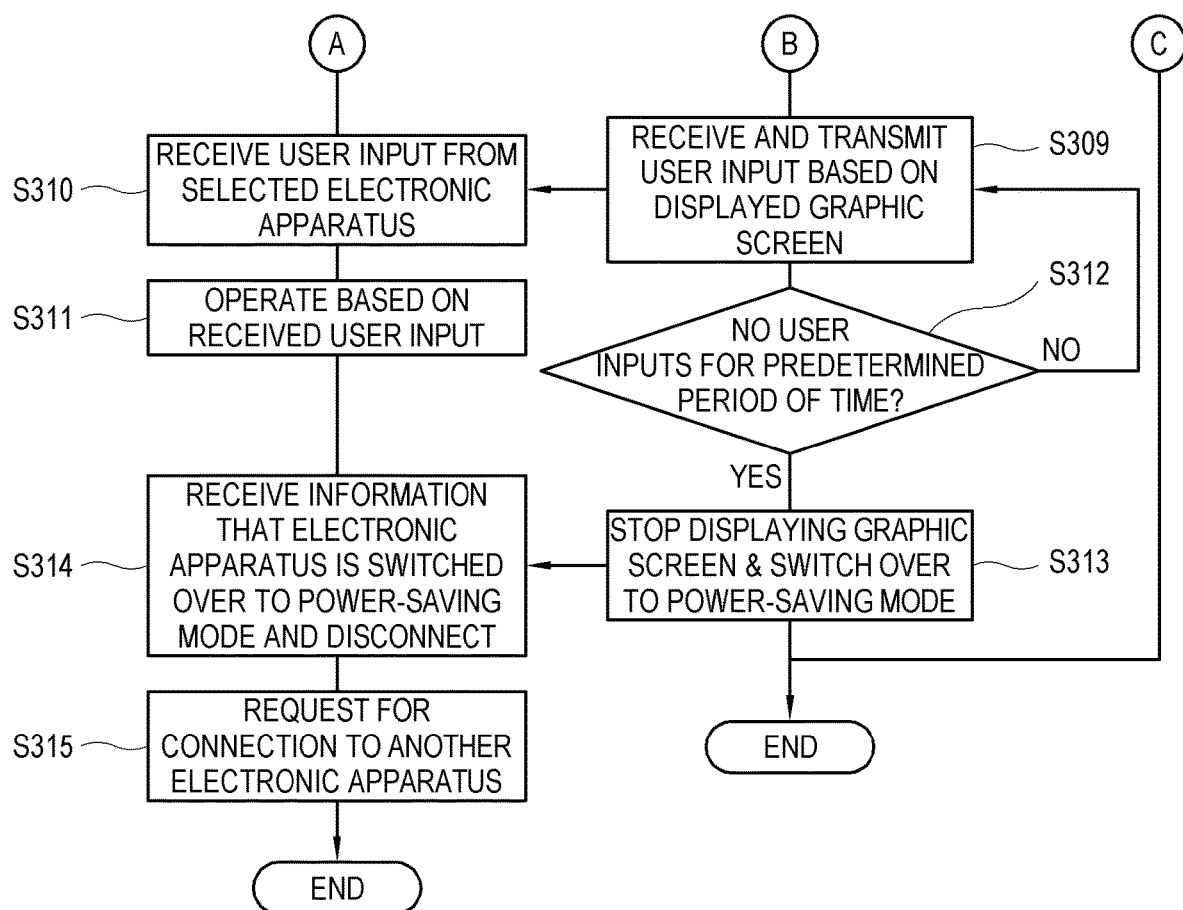

FIGS. 3 and 4 are flowcharts showing operation of the display apparatus 100 according to an embodiment of the disclosure. The processor 104 of the display apparatus 100 according to an embodiment of the disclosure obtains the state information of the plurality of electronic apparatuses 200 (S301). Here, the state information of the electronic apparatus 200 refers to information related to the states of the electronic apparatus 200, such as an operation state of the electronic apparatus 200, or a driving state of each element in the electronic apparatus 200. For example, the state information of the electronic apparatus 200 may correspond to an operation state of a screen in the electronic apparatus 200 (whether the screen is turned on or off, or the like), information about whether a touch input is being received through the electronic apparatus 200, information about whether a predetermined application or program is being executed in the electronic apparatus 200, information detected or collected by various sensors of the electronic apparatus 200, etc. but not limited thereto. Further, the state information of the electronic apparatus 200 may include information about a movement state of the electronic apparatus 200. For example, the state information may include time information indicating when the most recent movement of the electronic apparatus 200 occurred and/or duration of the movement.

The processor 104 selects the electronic apparatus 200, which has a state suitable to receive a user input, among the plurality of electronic apparatuses 200 based on the obtained state information (S302). Here, the electronic apparatus 200 having a state suitable to receive a user input refers to the electronic apparatus 200 which is in a state convenient or easy for a user of the display apparatus 100 to make a user input to the display apparatus 100. For example, the electronic apparatus 200 having a state suitable for a user to make a user input may refer to an apparatus being currently used by the user of the display apparatus 100, or an apparatus being close to the user who is using the display apparatus 100. In this case, the display apparatus identifies an electronic apparatus which is in an optimal state or position for a user who is viewing the display apparatus 100 and offers a service, so that the user can easily make a user input to the display apparatus 100 through the identified electronic apparatus 200 without additional movement from the current position or other inconveniences.

When the processor 104 identifies that use of an external electronic apparatus 200 is necessary or provides a convenient interface to the user, based on a currently ongoing process of the display apparatus 100, the processor 104 transmits a connection request signal and information about a user input function to be carried out by the electronic apparatus 200 according to the currently ongoing process to the selected electronic apparatus 200 through the communicator 102 (S303). Here, the information about the user input function to be carried out by the electronic apparatus refers to information about a user interface (UI) to be displayed by the electronic apparatus to receive an input from a user in the electronic apparatus 200 after the display apparatus 100 and the electronic apparatus 200 are connected. The UI may include any UI related to a user input, which can be displayed by the electronic apparatus 200, and there are no limits to the content or form of the UI. For example, when the display apparatus 100 is in a state of displaying a web browser including a search box, and the search box is activated through a remote controller of the display apparatus 100, the display apparatus 100 displays a graphic keyboard on the display 101 of the display apparatus 100. In this case, the information about the user input function to be performed by the electronic apparatus, which will be transmitted from the display apparatus 100 refers to information needed for displaying the graphic keyboard. Specifically, the information may be related to the layout, the kind, etc. of the graphic keyboard, or may be a command issued to make a request for displaying the graphic keyboard. For example, when the display apparatus 100 is in a state of displaying a screen of paying for purchases and receives a payment request from a user through the electronic apparatus 200 such as the mobile phone, the information about the user input function to be performed by the electronic apparatus refers to information for displaying a UI for payment. Specifically, the information may include a command for requesting execution of a payment application of an electronic apparatus including product information product and price information, or a command for requesting display of a security keypad of the electronic apparatus.

Figure 22:
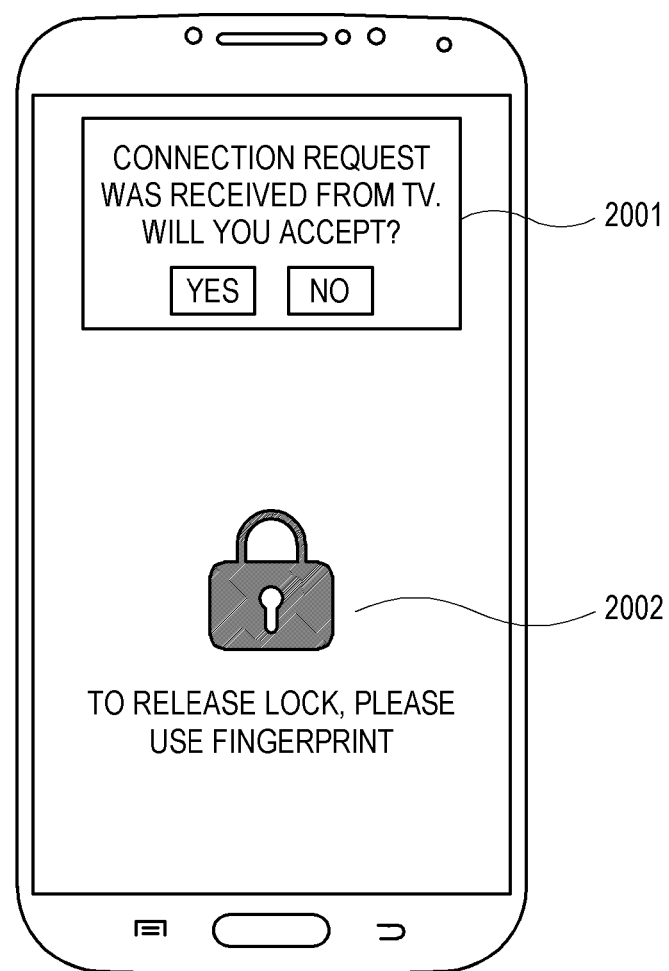
FIGS. 22 to 24 illustrate examples of an operation screen when an electronic apparatus is in a locked mode according to an embodiment of the disclosure.

When the processor 104 of the display apparatus 100 transmits the connection request signal and the information of the user input function based on the current process, the processor 230 of the corresponding electronic apparatus 200 receives the connection request signal and the information about the function (S304) and outputs a UI for receiving a user input of accepting the connection request (for example, displays a UI item) (S305). As an example of the UI for receiving the user input of accepting the connection request, the processor 230 of the electronic apparatus 200 may display a text message such as "Will you accept the connection request from the TV?" and a YES/NO selection button 2001 on the display 210 of the electronic apparatus 200 as shown in FIG. 22. However, the UI for receiving a user input of accepting the connection request is not limited to the foregoing example. Alternatively, a guide voice, a bell or a melody for receiving a user input of voice may be output to request the user input of voice. Likewise, any method of receiving a user input of accepting the connection request is possible. Further, a UI item may be displayed even when the electronic apparatus 200 is in a locked mode or a locked state. In this case, the UI item may together with a UI 2002 indicating the locked mode be displayed on the display 210 of the electronic apparatus 200.

When it is identified based on reception of a user input with regard to the UI item that a user intends to accept the connection request signal (S306), the processor 230 of the electronic apparatus 200 transmits a response of accepting the connection request to the display apparatus 100, and the processor 104 of the display apparatus 100 receives the response and performs connection with the selected electronic apparatus 200 (S307).

There are no specific limits to a communication method between the display apparatus 100 and the electronic apparatus 200, and as such, a connection method between the two apparatuses is varied depending on the communication method between the two apparatuses without limitations. For example, when both the display apparatus 100 and the electronic apparatus 200 support communication based on BLE, the two apparatuses have to first perform pairing for connection between the two apparatuses. After the two apparatuses are paired once, the display apparatus 100 and the electronic apparatus 200 may store their opponent address information, for example, Bluetooth media access control (BT MAC) addresses.

Figure 20:
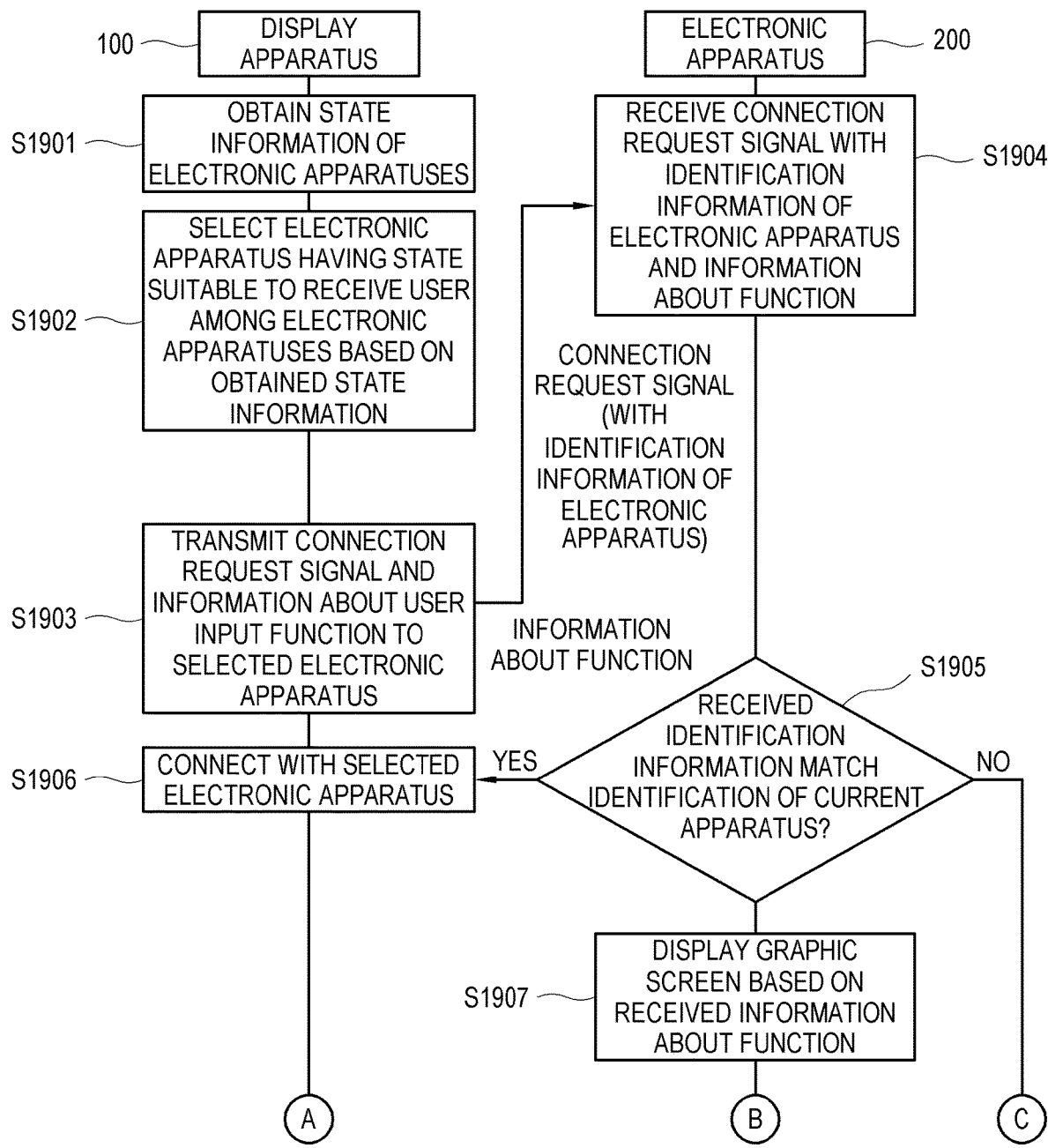
FIGS. 20 and 21 are flowcharts showing an operation of a display apparatus and an electronic apparatus according to still another embodiment of the disclosure.
Figure 21:
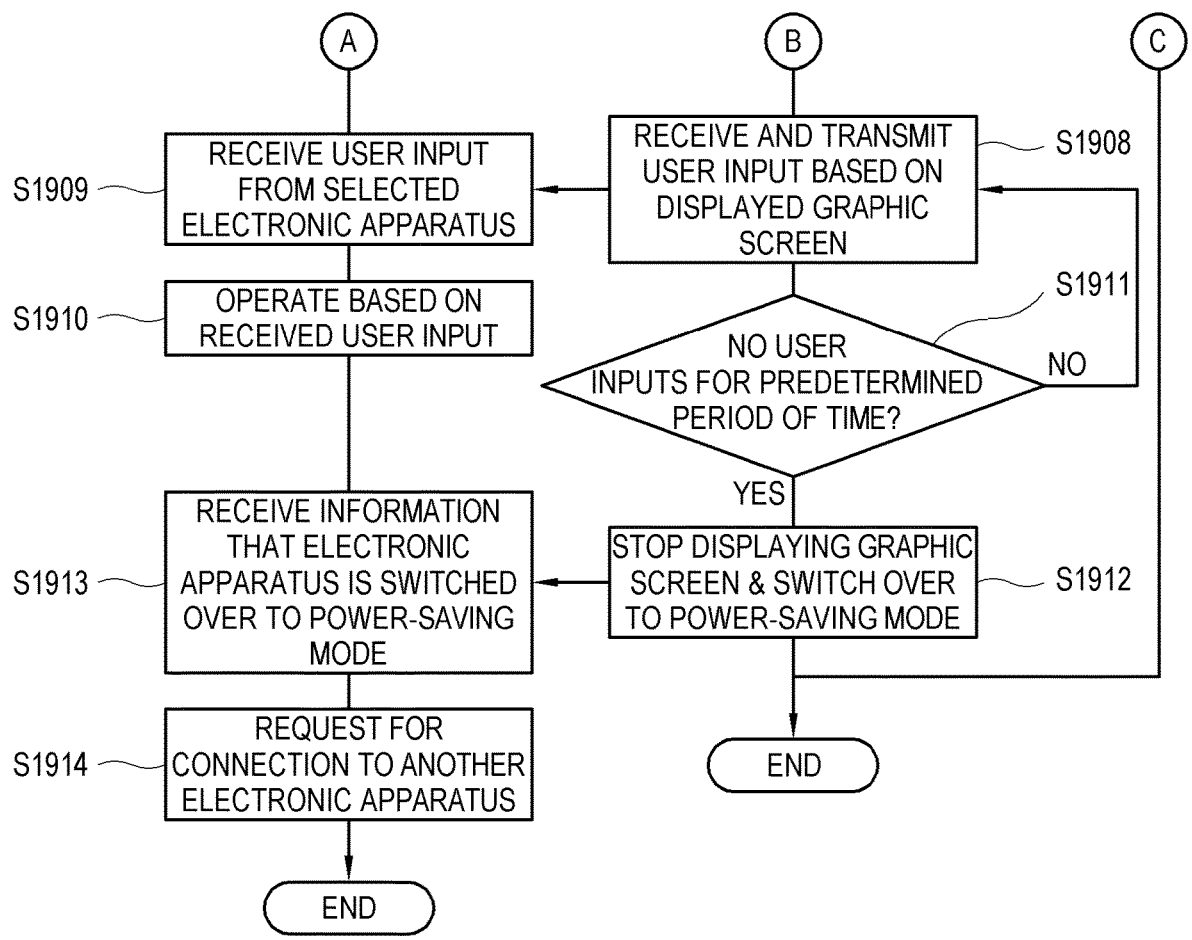

When the address information of the electronic apparatus 200, to which the connection request signal is transmitted, for example, the BT MAC address of the corresponding electronic apparatus 200 has been stored in the display apparatus 100, the processor 104 of the display apparatus 100 may transmit the identification information of the electronic apparatus 200 along with the signal for connection with the electronic apparatus 200. In this case, the display apparatus 100 and the electronic apparatus 200 may connect with each other even though a user of the electronic apparatus 200 does not make a separate input of accepting the connection request. Specifically, as shown in FIG. 20, when the connection request signal involving the identification information of the electronic apparatus 200 is received from the display apparatus 100 (S1904), the processor 230 of the electronic apparatus 200 identifies whether the identification information received from the display apparatus 100 matches the identification information of the current apparatus without displaying a separate UI item, through which a user can make an input of accepting the connection request, or without receiving a separate user input (S1905), and accepts the connection request from the display apparatus 100 when they match each other, thereby performing connection with the display apparatus 100. In other words, as compared with FIG. 3, the display apparatus 100 of FIG. 20 transmits the connection request signal involving the identification information of the electronic apparatus 200 to the electronic apparatus 200, and the electronic apparatus 200 receiving the connection request signal with the identification information identifies only whether the identification information involved in the connection request signal matches its own identification information even without separately receiving a user input of accepting the connection request, or immediately performs connection with the display apparatus 100 without any separate identifying process.

When the display apparatus 100 and the electronic apparatus 200 are connected through the foregoing process, the processor 230 of the electronic apparatus 200 displays a graphic screen for receiving a user input on the display 210 of the electronic apparatus 200 based on received information about the function (S308), and transmits a user input, which is received from a user based on the displayed graphic screen, to the display apparatus 100 (S309 in FIG. 4). Here, the graphic screen for receiving a user input refers to a graphic screen about a UI to be displayed on the electronic apparatus to receive a user input in the electronic apparatus 200 after the connection between the display apparatus 100 and the electronic apparatus 200, as described above with regard to the information about the user input function to be performed by the electronic apparatus according to the currently ongoing process in relation to the operation S303. For example, the graphic screen may include a graphic keyboard, a security keypad, etc. but there are no limits to the content or form of the graphic screen.

The processor 104 of the display apparatus 100 receives a user input from the electronic apparatus 200 (S310) and performs operation based on the received user input (S311). According to an embodiment, when there is an additional electronic apparatus 200 to which the display apparatus 100 transmits the connection request signal, the processor 104 of the display apparatus 100 may transmit a connection request canceling signal to the additional electronic apparatus 200.

Although there are a plurality of electronic apparatuses around the display apparatus 100 of the disclosure, the display apparatus 100 can automatically select and make the connection request to the electronic apparatus 200 suitable to receive a user input, so that a user can immediately make the user input for the display apparatus through the electronic apparatus 200 without undergoing cumbersome connection procedures. Further, during a process of connecting the display apparatus 100 and the electronic apparatus 200, the user input together with information about a function to be performed in the electronic apparatus 200 is transmitted to the electronic apparatus 200, so that the function needed after the connection with the display apparatus 100 can be immediately executed in the electronic apparatus 200, thereby providing improved convenience to the user.

Meanwhile, as described above, after a user input in the electronic apparatus 200 based on the graphic screen displayed on the electronic apparatus 200 is transmitted to the display apparatus 100 and the display apparatus 100 operates based on the user input, when there are no user inputs to the electronic apparatus 200 for a predetermined period of time (S312), the electronic apparatus 200 stops displaying the graphic screen and enters the power-saving mode (S313). In this case, the display apparatus 100 receives information, which indicates that the electronic apparatus 200 switched over to the power-saving mode, from the electronic apparatus 200 and performs disconnection from the electronic apparatus 200 (S314). Furthermore, the display apparatus 100 may transmit a connection request to another electronic apparatus 200 (S315). According to an embodiment, in response to a predetermined signal received from the display apparatus 100, the processor 230 of the electronic apparatus 200 may stop displaying the graphic screen displayed on the electronic apparatus 200.

Meanwhile, the electronic apparatus 200 may receive the connection request signal in the power-saving mode or in a state that a display 101 is turned off. In this case, the processor 230 of the electronic apparatus 200 may control the display 101 to be turned on, and then perform the operation following the foregoing operation S304. In this case, when the electronic apparatus 200 is in the locked mode, the processor 230 may control the display 210 to be turned on while maintaining the locked mode.

Figure 5:
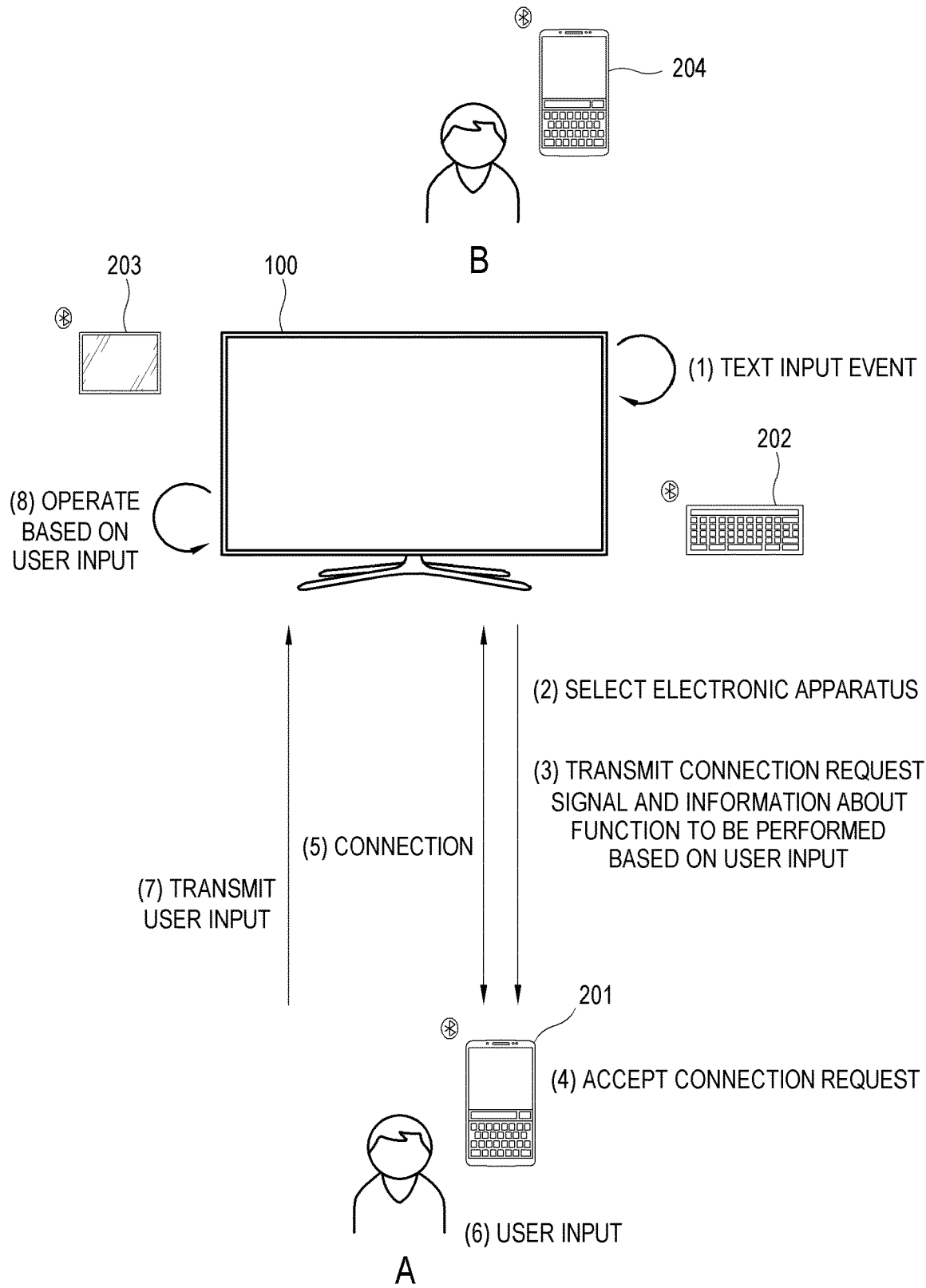
FIG. 5 shows an operation between a display apparatus and an electronic apparatus according to an embodiment of the disclosure.

Referring to FIG. 5, a concrete example of the operation between the display apparatus 100 and the electronic apparatus 200 will be described. For convenience of description, it will be described by way of example below that the display apparatus 100 is a TV, but the disclosure is not limited to this example.

In a case where a user A is watching a TV 100 and a plurality of electronic apparatuses 200, such as a smartphone 201 of the user A, a Bluetooth keyboard 202, a tablet computer 203, and a smartphone 204 of a user B are present around the TV 100, the processor 104 of the TV 100 obtains the state information from the plurality of electronic apparatuses 200. For example, the processor 104 obtains information about each of the electronic apparatuses 201-204 themselves and operation states of electronic apparatus screens, that is, information whether each screen of the electronic apparatus 20 is turned on or not, and the like information. Alternatively, the processor 104 may obtain time information about a time when a sensor of an electronic apparatus detects movement of the electronic apparatus and duration of the movement, from each of the electronic apparatuses 201-204. The processor 104 may store the obtained information in the storage 103.

When an event, such as when a text is required to be input to the TV 100 occurs while the user A is watching and using the TV 100 (see (1) of FIG. 5), for example, when a search word for Internet search is required to be input to the TV 100, the processor 104 of the TV 100 selects an electronic apparatus, which is in a state suitable to receive a user input, among the plurality of electronic apparatuses 201-204 based on the obtained state information (see (2) of FIG. 5). For example, in the embodiment shown in FIG. 5, the processor 104 of the TV 100 selects an electronic apparatus, of which a screen is identified as turned on, for example, the smartphone 201 among the plurality of electronic apparatuses 201-204. This is because the electronic apparatus of which the screen is turned on can be regarded as an electronic apparatus being used by a user who is watching the TV.

The processor 104 that selects the smartphone 201 as the electronic apparatus targeted for the connection provides the connection request signal and the information about the user input function to the smartphone 201 (see (3) of FIG. 5). In this embodiment, there is a need of inputting the search word for the Internet search in the TV 100, and therefore the information about the user input function to be performed is information that needs display of the graphic keyboard.

The smartphone 201 that receives the connection request signal from the TV 100 displays corresponding information, for example, a message of "Will you accept the connection request from the TV?" on the screen of the smartphone 201, thereby receiving a user input of accepting the connection request (see (4) of FIG. 5).

When the user of the smartphone 201 makes a user input for accepting the connection request, the TV 100 and the smartphone 201 are connected to each other (see (5) of FIG. 5), and the processor 230 of the smartphone 201 displays a virtual keyboard based on information about a function to be carried out by the smartphone (in this embodiment, information about the virtual keyboard) received from the TV 100, on the display 210 of the smartphone 201, so that the user can use the virtual keyboard to make a user input through the smartphone 201 (see (6) of FIG. 5).

Then, the information input by the user through the smartphone 201 is transmitted to the TV 100 connecting with the smartphone 201 (see (7) of FIG. 5), and the TV 100 receives the information and performs operation based on the received user input, for example, in this embodiment, operation of carrying out the Internet search based on a keyword of a user input value, displaying a search result, etc. (see (8) of FIG. 5).

Figure 6:
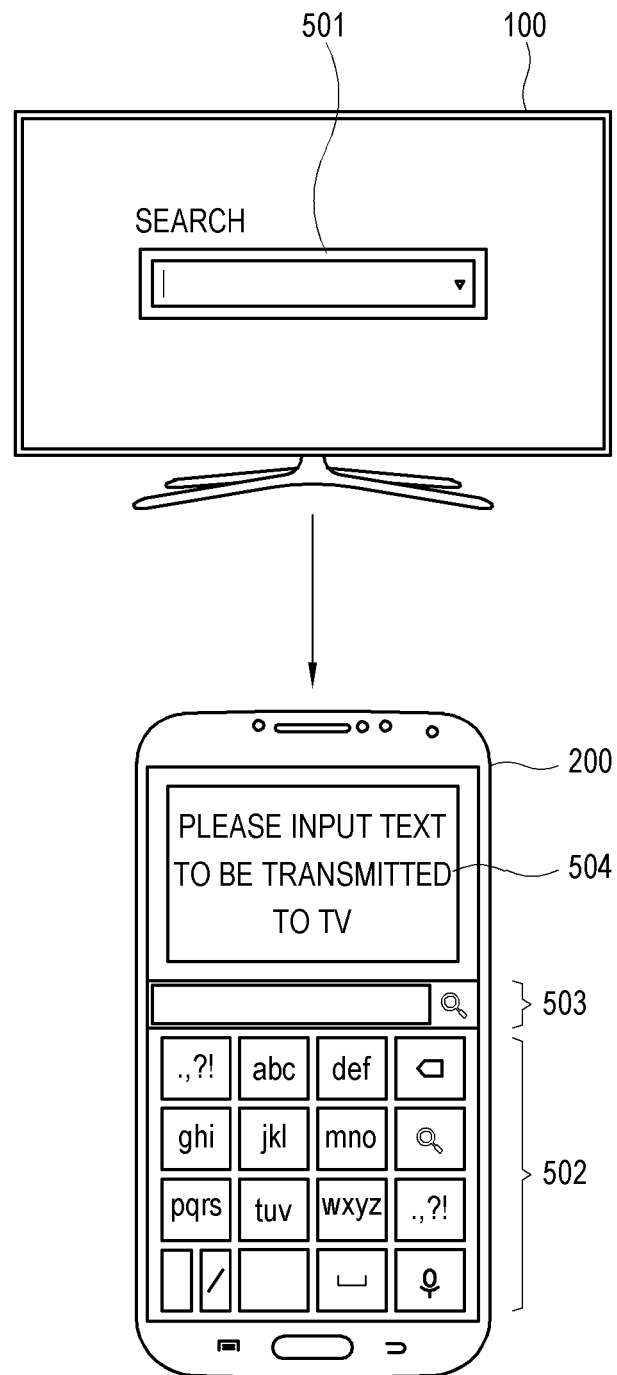
FIG. 6 illustrates an example of display screens of a display apparatus and an electronic apparatus according to an embodiment of the disclosure.

FIG. 6 illustrates an example of display screens of a display apparatus 100 according to an embodiment of the disclosure and an electronic apparatus 200. For example, when a user who is watching the smart TV 100 needs the Internet search and presses a search button of a remote controller, a search box 501 for inputting a search word may be displayed on a screen of the TV 100.

In response to this, the smartphone 201 selected by the processor 104 of the TV 100 as the electronic apparatus, which is in a state suitable to receive the user input, among the plurality of electronic apparatuses and connected to the TV 100 may display a keyboard 502 for receiving a search word as the graphic screen for receiving a user input on the display 210. A display window 503 for directly checking a character string input to the smartphone 201 may be displayed together with the keyboard 502. Further, a UI 504 may be also displayed to inform that a character input to the smartphone 201 through the keyboard 502 is not made for the search in the smartphone but transmitted to the TV.

However, the display screens of the display apparatus 100 and the electronic apparatus 200 shown in FIG. 6 are merely given by way of example, and the case of requiring a user input on the screen of the display apparatus 100 according to the disclosure is not limited to this example. Further, there are no limits to the kind, content and form of the function to be performed based on the user input to the electronic apparatus 200.

Meanwhile, even when the electronic apparatus 200 is in the locked mode or the locked state, the processor 230 of the electronic apparatus 200 can receive a connection request signal and information about a user input function from the display apparatus 100 and display a corresponding graphic screen. In other words, the processor 230 of the electronic apparatus 200 may display a graphic screen based on the information about the user input function while keeping the locked state of the electronic apparatus 200. In this regard, descriptions will be made with reference to FIGS. 22 to 24.

When the processor 230 of the electronic apparatus 200 (for example, the smartphone 201 of the user A) receives the connection request and the information about the user input function from the display apparatus 100 in the locked mode, information about such reception may be first displayed. For example, as shown in FIG. 22, the processor 230 of the electronic apparatus 200 may display a predetermined icon or a notification message 2001 given in the form of a text on an upper end portion of the display 210, together with a UI 2002 informing that the electronic apparatus 200 is in the locked mode, on the display 210 of the electronic apparatus 200 while keeping the locked mode of the electronic apparatus 200.

Figure 23:
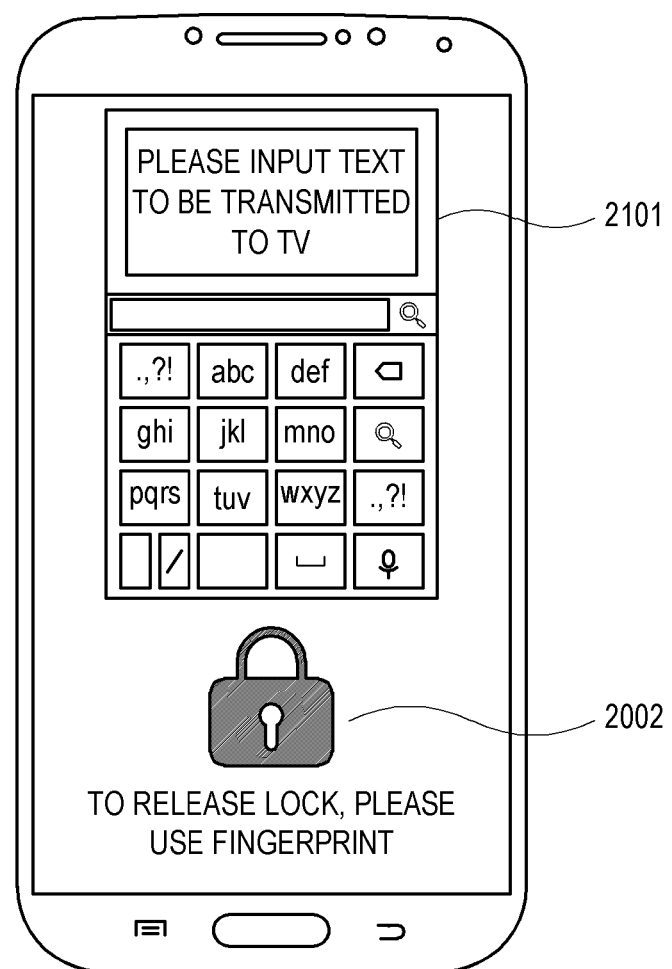

When a user input of accepting the connection request from the display apparatus 100 is made by selecting the notification message or icon, the processor 230 of the electronic apparatus 200 may display the graphic screen based on the information about the user input function received from the display apparatus 100, for example, a graphic keyboard UI 2101 as shown in FIG. 23, in a state that the locked mode is not released. In this case, the graphic keyboard UI 2101 may or may not be displayed together with the UI 2002 informing that the electronic apparatus 200 is in the locked mode as shown in FIG. 23. For example, when pattern input, fingerprint recognition, face recognition, iris recognition, etc. are possible as a user authentication method of releasing the locked mode of the electronic apparatus 200, the processor 230 of the electronic apparatus 200 may not display a screen related to user authentication, for example, a pattern input screen or the like while displaying the graphic screen 2101. In other words, when the graphic keyboard UI 2101 is displayed in the locked mode, the processor 230 of the electronic apparatus 200 may not display a UI for the user authentication even though a user input to the electronic apparatus 200 is detected. On the other hand, when a user input to the electronic apparatus 200 is detected in a general locked mode state where the graphic keyboard UI received from the display apparatus 100 is not displayed, the processor 230 may display the UI for the user authentication.

Figure 24:
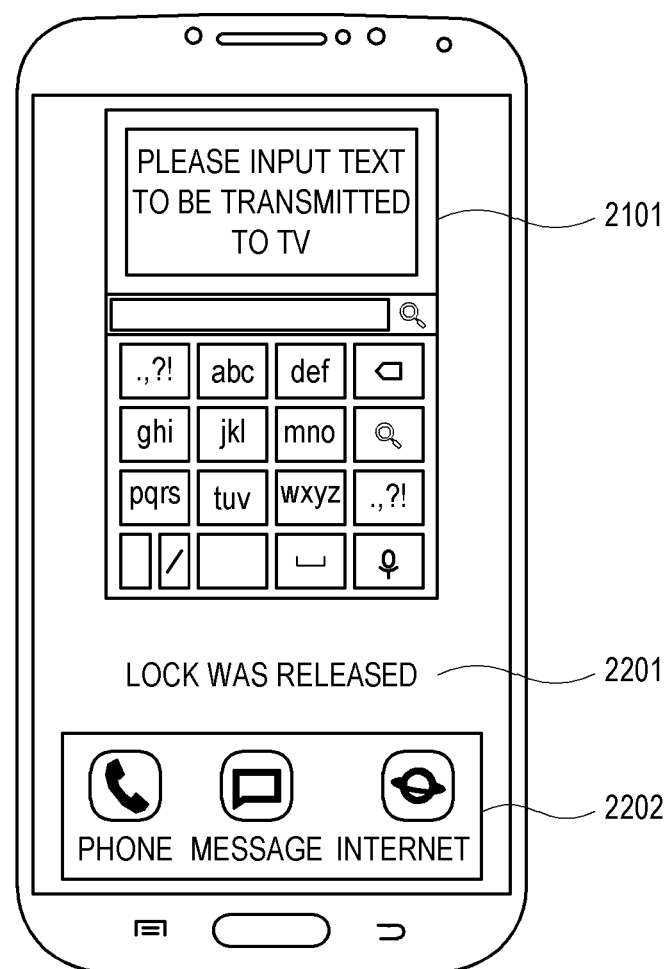

Meanwhile, when the user authentication succeeds while the display 210 of the electronic apparatus 200 is displaying the graphic keyboard UI 2101 as the graphic screen, for example, when a fingerprint of a user is detected and identified as the fingerprint of the user who is using the electronic apparatus 200, the processor 230 of the electronic apparatus 200 may for example release the locked mode of the electronic apparatus 200 and display the graphic keyboard UI 2101 together with an initial screen of the electronic apparatus 200 or screens 2201 and 2202 automatically displayed when the locked mode is released, as shown in FIG. 24.

Thus, the electronic apparatus 200 can be used to provide a user input to the display apparatus even through the electronic apparatus is in the locked mode. Further, even when a user cannot release the locked state of the electronic apparatus because the electronic apparatus selected by the display apparatus is not currently owned by the user or for the like reasons, the use can make a user input based on content displayed on the selected electronic apparatus.

Figure 7:
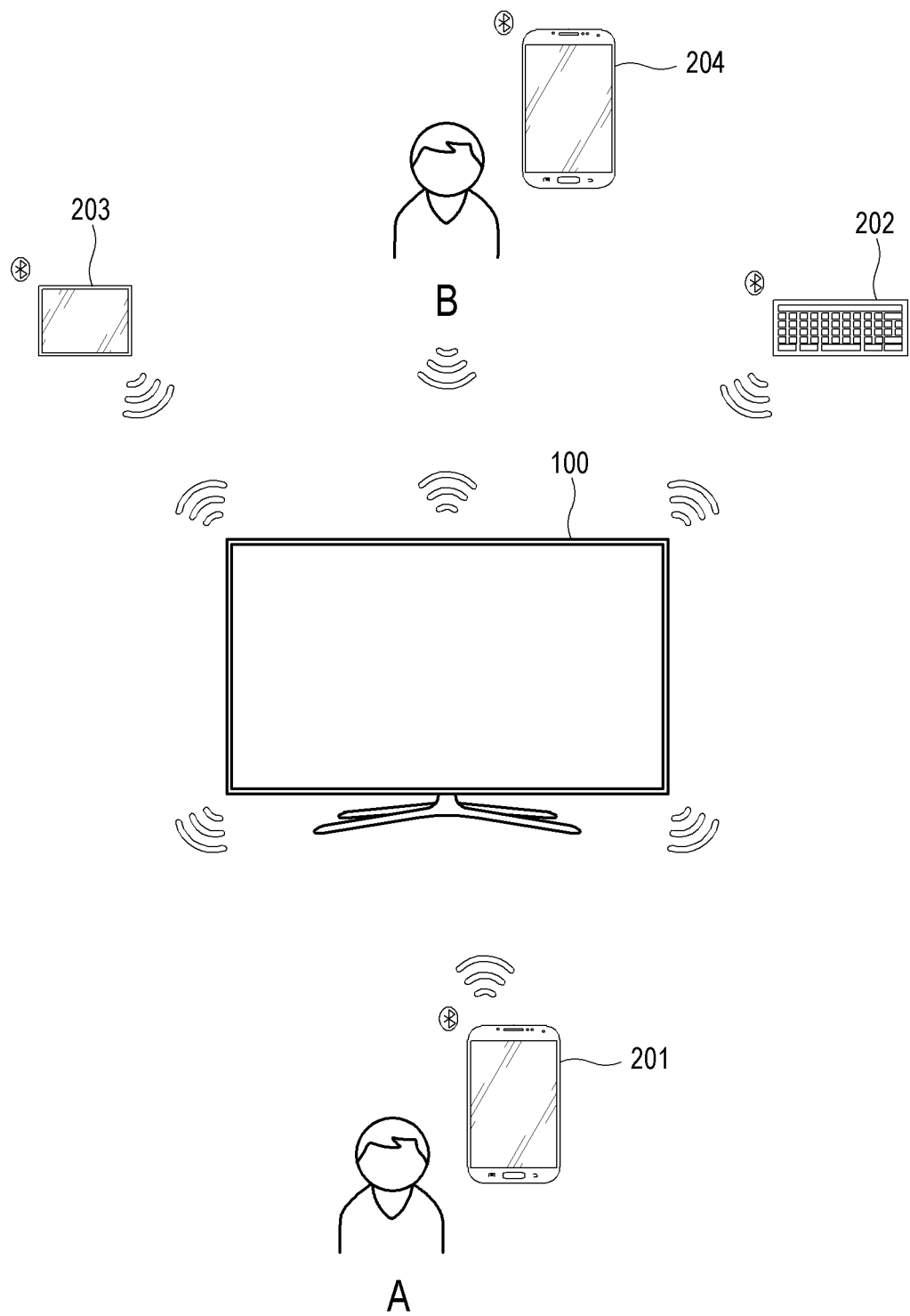
FIG. 7 illustrates an example of a method where a display apparatus searches for an electronic apparatus according to an embodiment of the disclosure.

FIG. 7 illustrates an example of a method where a display apparatus 100 according to an embodiment of the disclosure searches for the electronic apparatus 200. The processor 104 of the display apparatus 100 according to an embodiment of the disclosure may search for an electronic apparatus 200 positioned around the display apparatus 100 and connectable with the display apparatus 100. According to an embodiment, the display apparatus 100 may previously identify information of each electronic apparatus before selecting the electronic apparatus, which is in a state suitable to receive a user input, among the plurality of electronic apparatuses.

For example, in a case where a smartphone 201 of a user A, a Bluetooth keyboard 202, a tablet computer 203, and a smartphone 204 of a user B are present as a plurality of electronic apparatuses 200 around the display apparatus 100, and each apparatus supports a BLE communication function, each of the electronic apparatuses 201-204 may emit a BLE signal every three seconds to connect with other apparatuses. In addition, the display apparatus 100 may scan the BLE signal every two seconds to search for the electronic apparatus 200 positioned around and connectable with the display apparatus 100. With this configuration, the display apparatus 100 can search for the electronic apparatus 200 positioned around and connectable with the display apparatus 100. However, there are no limits to the kind of communication module, a cycle of the electronic apparatus emitting a communication signal, or a cycle of the display apparatus 100 scanning the communication signal.

The processor 104 of the display apparatus 100 may identify how far each electronic apparatus 200 is from the display apparatus 100 based on the strength of the BLE signal received from the peripheral electronic apparatus 200, and thus select the electronic apparatus 200 easily and more conveniently usable by a user who is currently using the display apparatus 100. In other words, only the electronic apparatus 200 present within a specific distance from the display apparatus 100 may be selected as the electronic apparatus 200 usable by a user. The specific distance may be a predetermined distance. For example, when a predetermined distance is set to 3 meters (3 m), only the electronic apparatus 200 positioned within 3 m from the display apparatus 100 may be selected as the electronic apparatus usable by a user. Specifically, in a case where the screens of the smartphone 201 of the user A and the smartphone 204 of the user B are all turned on, the screen of the tablet computer 202 is turned off, the smartphone 201 of the user A is at a distance of 4 m from the TV 100, and the smartphone 204 of the user B is at a distance of 2 m from the TV 100, the processor 104 of the TV 100 selects the smartphone 204 of the user B. In a case where both the smartphone 201 of the user A and the smartphone 204 of the user B have the turned-on screens and are positioned within the distance of 3 m from the display apparatus 100, the processor 104 of the display apparatus 100 may select all of the smartphone 201 of the user A and the smartphone 204 of the user B.

Figure 8:
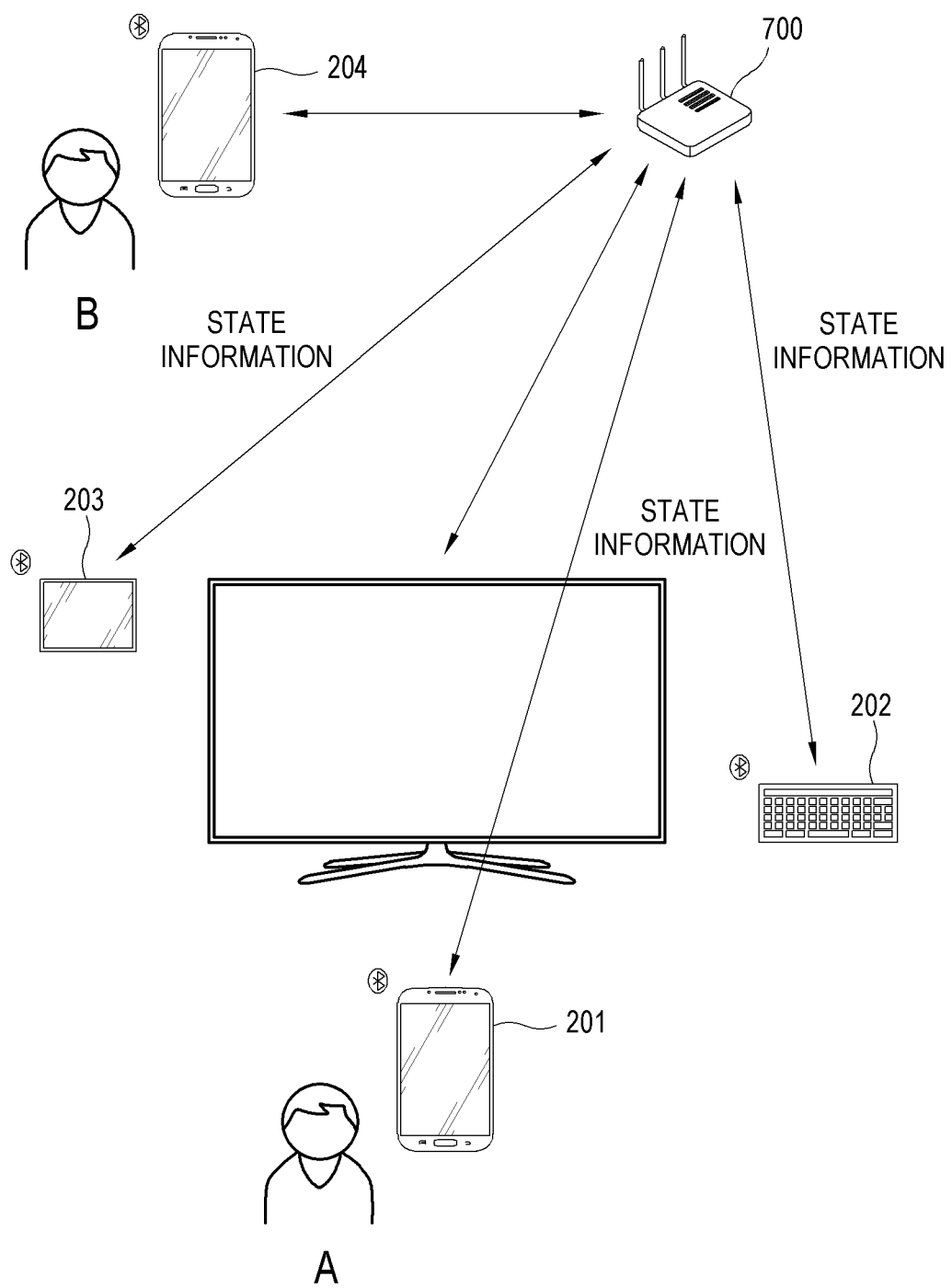
FIG. 8 illustrates an example of a method where a display apparatus obtains state information of an electronic apparatus according to an embodiment of the disclosure.

FIG. 8 illustrates an example of a method where a display apparatus 100 according to an embodiment of the disclosure obtains state information of an electronic apparatus 200. To obtain the state information of the electronic apparatus 200, the display apparatus 100 according to an embodiment of the disclosure may further include a second communicator configured to communicate with a server. In this case, the processor 104 of the display apparatus 100 may obtain the state information from the server through the second communicator.

For example, as shown in FIG. 8, in a case where a smartphone 201 of a user A, a Bluetooth keyboard 202, a tablet computer 203, and a smartphone 204 of a user B are present as a plurality of electronic apparatuses 200 around the TV 100, each of the electronic apparatuses 201-204 may periodically transmit its own state information to the server through an access point (AP) 700. The processor 104 of the TV 100 including the second communicator capable of communicating with the server may obtain each state information of the electronic apparatus 201-204 from the server through the second communicator. In other words, the server may receive the state information from the electronic apparatus 200, and transmit the received state information to the display apparatus 100.

Alternatively, the AP 700 may function as the server. In other words, the state information transmitted from each of the electronic apparatuses 201-204 may be stored in the AP 700, and may be transmitted from the AP 700 to the TV 100 in response to a request from the processor of the TV 100. However, the method of obtaining the state information of the electronic apparatus 200 through the second communicator by the display apparatus 100 according to the disclosure is not limited to the foregoing description. For example, the server may first make a request for the state information to each of the electronic apparatuses 201-204, and therefore the state information may be collected in the server. Likewise, there are no limits to the communication method between the TV 100 and the server, and the communication method between the server and the electronic apparatuses 201-204.

To obtain the state information of the electronic apparatus 200 by the display apparatus 100, the processor 104 of the display apparatus 100 may directly communicate with the electronic apparatus 200 to obtain the state information. As a direct communication method between the display apparatus 100 and the electronic apparatus 200, there may for example be Bluetooth, BLE, Wi-Fi, Wi-Fi Direct, NFC, etc. without limitations. Specifically, when BLE communication is possible between the display apparatus 100 and the electronic apparatus 200 by way of example, the electronic apparatus 200 may provide its own state information, for example, information about whether its screen is turned on or off, through the BLE communication, and the display apparatus 100 may receive the information and obtain the state information of the electronic apparatus 200. In this case, a BLE signal transmitted from the electronic apparatus 200 to the display apparatus 100 may involve the identification information of the electronic apparatus 200 that transmits the BLE signal. Then, when the processor 104 of the display apparatus 100 selects the electronic apparatus 200 that transmits the BLE signal, and therefore there is a need of transmitting the connection request signal to the corresponding electronic apparatus 200, the connection request signal may be transmitted to the corresponding electronic apparatus 200 based on the identification information of the electronic apparatus 200 transmitted as involved in the BLE signal. Alternatively, as described above with reference to FIG. 3, the connection request signal may be transmitted to the electronic apparatus 200 based on the address information (e.g. a BT MAC address) of the electronic apparatus 200 stored in the display apparatus 100 as the display apparatus 100 and the electronic apparatus 200 are paired. Below, the method of selecting the electronic apparatus 200 by the processor 104 of the display apparatus 100 according to an embodiment of the disclosure will be described with reference to FIGS. 9 to 16.

As an example of the method of selecting an electronic apparatus 200 having a state suitable to receive a user input among the plurality of electronic apparatuses 200 based on the state information of the plurality of electronic apparatuses 200 by the processor 104 of the display apparatus 100 according to an embodiment of the disclosure, the selection based on the information about the operation state of the screen of the electronic apparatus 200 was previously described with reference to FIG. 5. However, an embodiment of the disclosure is not limited to this example.

Figure 9:
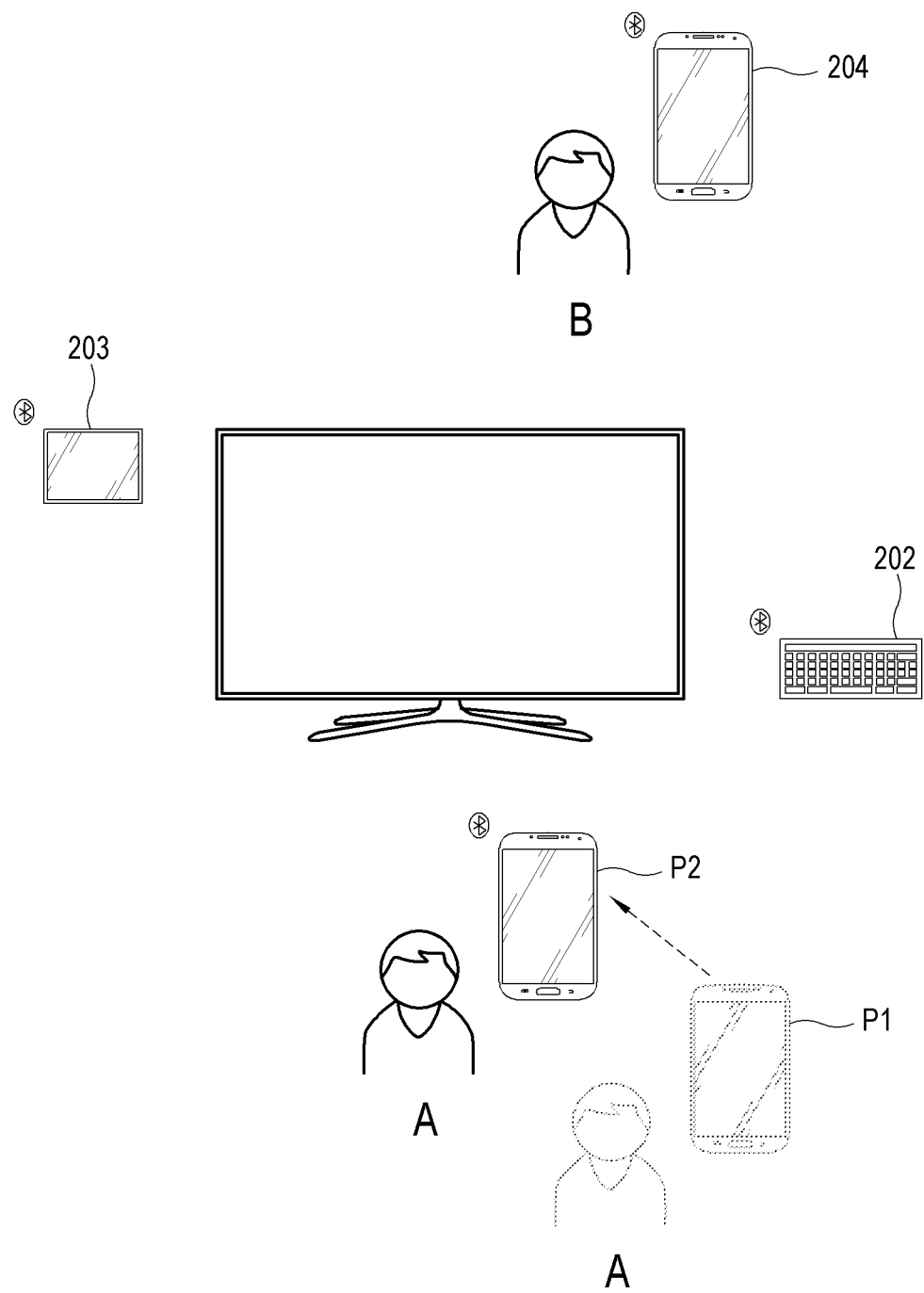
FIGS. 9 to 16 illustrate various examples of a method where a display apparatus selects an electronic apparatus according to an embodiment of the disclosure.

For example, the processor 104 of the display apparatus 100 according to an embodiment of the disclosure may select the electronic apparatus 200 having a state suitable to receive a user input among the plurality of electronic apparatuses 200 based on the state information about the movement of the plurality of electronic apparatuses 200. For example, as shown in FIG. 9, when a smartphone 201 of a user A, a Bluetooth keyboard 202, a tablet computer 203, and a smartphone 204 of a user B are present around the TV 100, and the movement of the smartphone 201 from a first position P1 to a second position P2 is detected, but no movements of the Bluetooth keyboard 202 and the tablet computer 203 are detected, the processor 104 may select the electronic apparatus corresponding to the detected movement as an electronic apparatus targeted for connection. For instance, the processor 104 of the display apparatus 100 may select the smartphone 201, which moves from the first position P1 to the second position P2, as an electronic apparatus targeted for connection. The movement of the smartphone 201 from a first position P1 to a second position P2 is recently detected. This is because the electronic apparatus of which the position has recently been moved is highly likely to be identified as an electronic apparatus that has recently been used by a user. With a motion sensor such as an acceleration sensor, a gyro sensor, etc., an indoor positioning sensor based on triangulation, etc., a global positioning system (GPS) sensor, or the like provided inside the electronic apparatus 200, it may be identified whether the position of the electronic apparatus 200 is moved or not. However, there are no limit to the detection method. When the movement of the electronic apparatus 200 is detected, the processor 230 of the electronic apparatus 200 may provide information related to the movement together with time information to the server, the AP 700 or directly to the TV 100. Alternatively, when information about the movement is received from each electronic apparatus 200, the TV 100 may store the information about the movement together with time information.

Thus, movement information about whether or how much the position of the electronic apparatus 200 is moved is used, thereby improving reliability in selecting the electronic apparatus 200.

Figure 10:
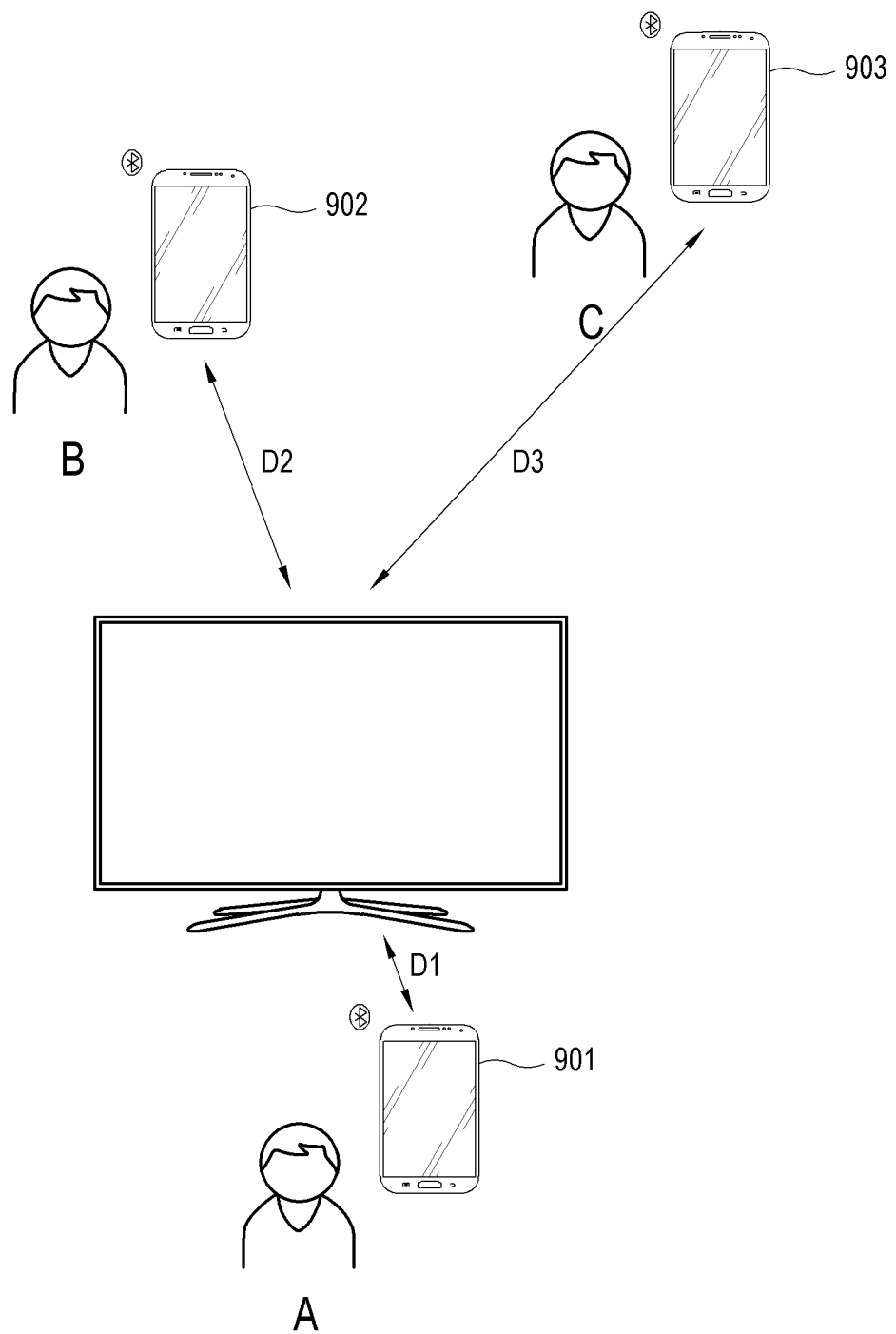

Alternatively, according to an embodiment illustrated in FIG. 10, the processor 104 may further take a distance between the display apparatus 100 and the electronic apparatus 200 into account to select the electronic apparatus 200 having a state suitable to receive a user input among the plurality of electronic apparatuses 200. For example, as shown in FIG. 10, when the TV is closest to a smartphone 901 of a user A at a distance D1 and close to a smartphone 902 of a user B at a distance D2 and a smartphone 903 of a user C at a distance D3 in sequence as a result of measuring distances between the TV 100 and the smartphones 901-903 of the users A to C present around the TV 100, the smartphone 901 of the user A closest to the TV 100, i.e., D1 smaller than D2 and D3, may be selected as the electronic apparatus targeted for connection. This is because it may be identified that the position of the electronic apparatus gets closer to a user who is currently watching the TV 100 as the electronic apparatus gets closer to the TV 100.

However, the electronic apparatus 200 close to the display apparatus 100 is not all identified as the electronic apparatus 200 suitable to receive a user input. For example, the electronic apparatus 200 positioned at a predetermined distance may be selected based on data that the electronic apparatus 200 which is at the predetermined distance from the display apparatus 100 is highly likely to be identified as the electronic apparatus 200 of a user who is currently using the display apparatus 100.

As a method of measuring the distance between the TV 100 and the electronic apparatus 200, the distance may be measured based on strength of a signal transmitted from the electronic apparatus 200 through the communicator 102 or information involved in the signal. For example, a received signal strength indication (RSSI) value may be measured, and a distance may be derived from the RSSI value. Alternatively, an infrared (IR) sensor or the like may be employed to measure the distance between the TV 100 and the electronic apparatus 200.

Thus, reliability of selecting the electronic apparatus 200 is improved.

Figure 11:
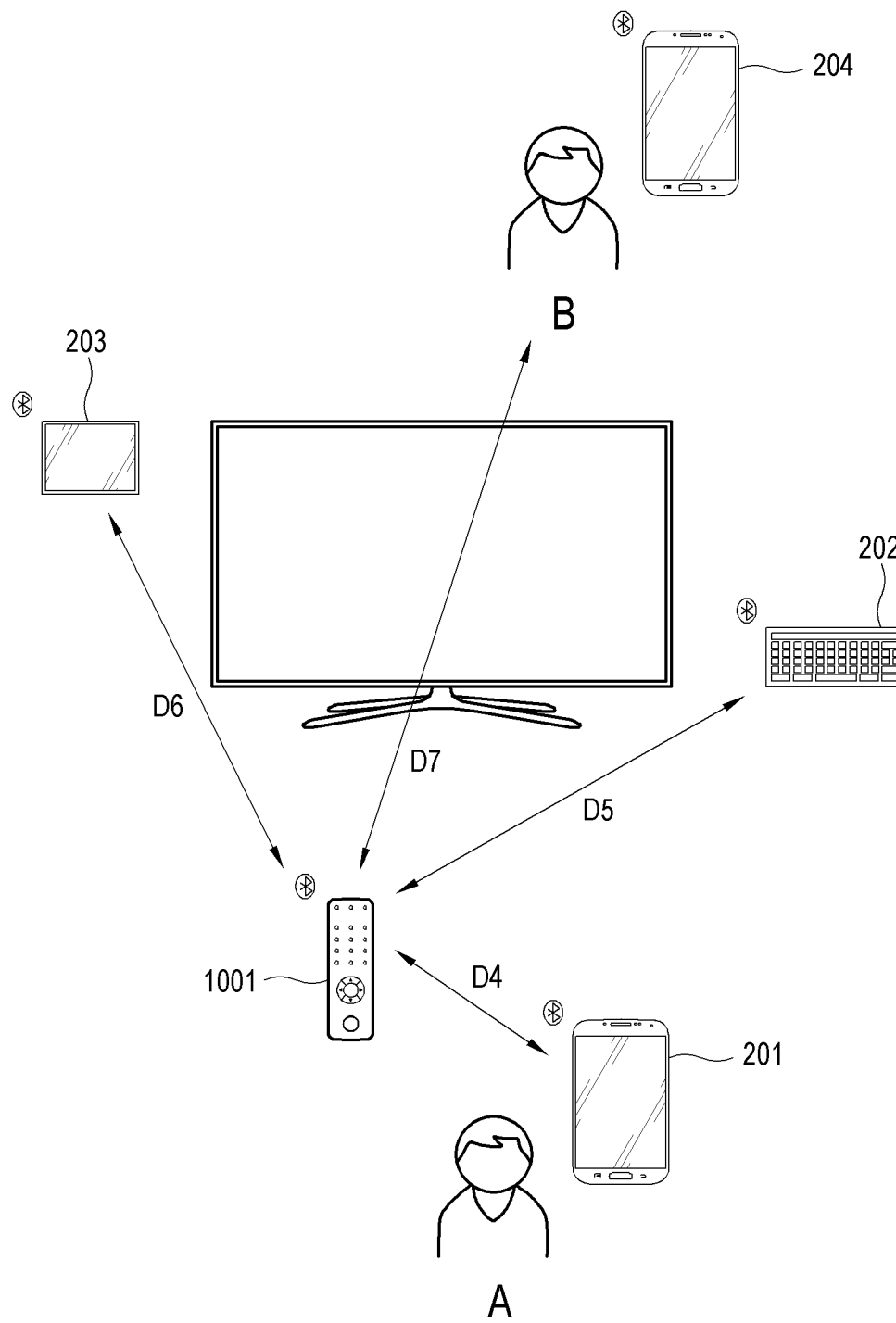

Alternatively, according to an embodiment illustrated in FIG. 11, the processor 104 of the display apparatus 100 according to an embodiment of the disclosure may select the electronic apparatus 200 having a state suitable to receive a user input, based on a distance between a remote controller 1001 for controlling the display apparatus 100 and the electronic apparatus 200. For example, when a user A of the TV 100 is watching the TV 100 by using the remote controller 1001, and distances among the smartphone 201 (distance D4), the Bluetooth keyboard 202 (distance D5), the tablet computer 203 (distance D6) and the smart phone 204 (distance D7) and the remote controller 1001 present around the TV 100 are as shown in FIG. 11, the processor 104 of the display apparatus 100 may select the smartphone 201 closest to the remote controller 1001, i.e., D4 smaller than D5, D6 and D7 as the electronic apparatus targeted for connection. When a user of the TV 100 uses the remote controller 1001, the remote controller 1001 is generally placed close to the user and frequently used. Therefore, the electronic apparatus 200 close to the remote controller 1001 is highly likely to be identified as the electronic apparatus that is currently used by a user or has been used until just now like the remote controller 1001.

The method of measuring the distance between the remote controller 1001 and the electronic apparatus 200, as mentioned above with reference to FIG. 10, may employ a measuring method based on the strength of the signal received from the electronic apparatus 200 through the communicator of the remote controller 1001 or the information involved in the signal. For example, when the remote controller 1001 is a Bluetooth remote controller, the electronic apparatus 200 targeted for connection may be selected based on RSSI information collected through the Bluetooth remote controller. Alternatively, on the other hand, the measuring method based on the strength of the signal received from the remote controller 1001 through the communicator 220 of the electronic apparatus 200 or the information involved in the signal may be used.

Thus, reliability of selecting the electronic apparatus 200 is improved.

As described above, various examples are given for the method of selecting the electronic apparatus 200 by the processor of the display apparatus 100 according to an embodiment of the disclosure, but the methods are not mutually exclusive. In other words, the processor 104 of the display apparatus 100 according to an embodiment of the disclosure may select the electronic apparatus 200 based on combination of the foregoing methods. To this end, the information referenced by the foregoing embodiments may be stored in the storage 103 and referenced as necessary.

Figure 12:
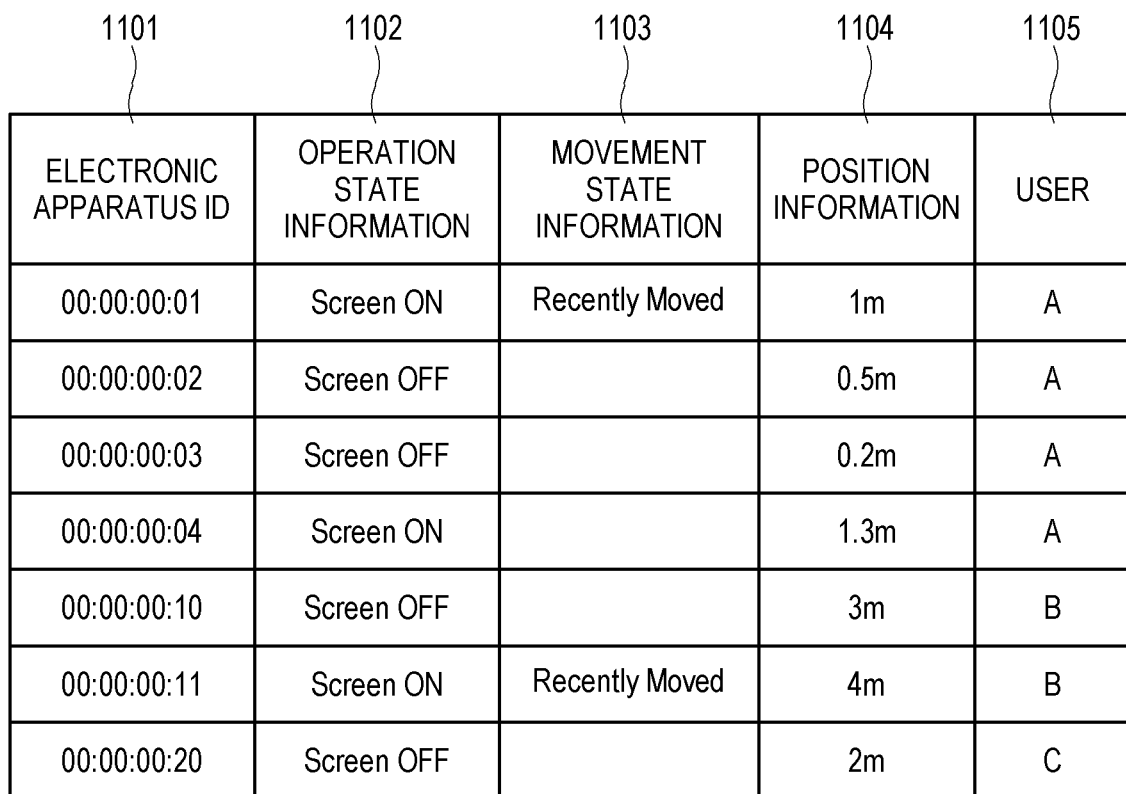

Specifically, the processor 104 of the display apparatus 100 according to an embodiment of the disclosure may tabulate the state information or the like obtained from the electronic apparatuses 200 and store a table in the storage 103. Referring to FIG. 12, the processor 104 may store state information of the electronic apparatuses 200, for example, identification values 1101, operation state information 1102 about screen on/off, movement state information 1103 about whether there was recent movement, and position information 1104 about distance from the display apparatus 100 as a database (DB) in the storage 103.

When an electronic apparatus 200 is selected based on various pieces of the foregoing information about the plurality of electronic apparatus 200 listed in FIG. 12, various methods are possible with respect to the combination and/or the proportion of the different types of information shown in the table in FIG. 12. For example, the processor 104 may take all pieces of information about the electronic apparatuses 200 into account to select the electronic apparatus 200 targeted for connection. Alternatively, the processor 104 may consider only some of the pieces of information about the electronic apparatuses 200 in order to select the electronic apparatus 200 targeted for connection. According to an embodiment, the processor 104 may consider only two or three pieces of information about the electronic apparatuses 200 in order to select the electronic apparatus 200 targeted for connection. In this case, there may be difference in priority or weight among the pieces of information, so that the electronic apparatuses 200 to be selected can be prioritized.

Figure 19:
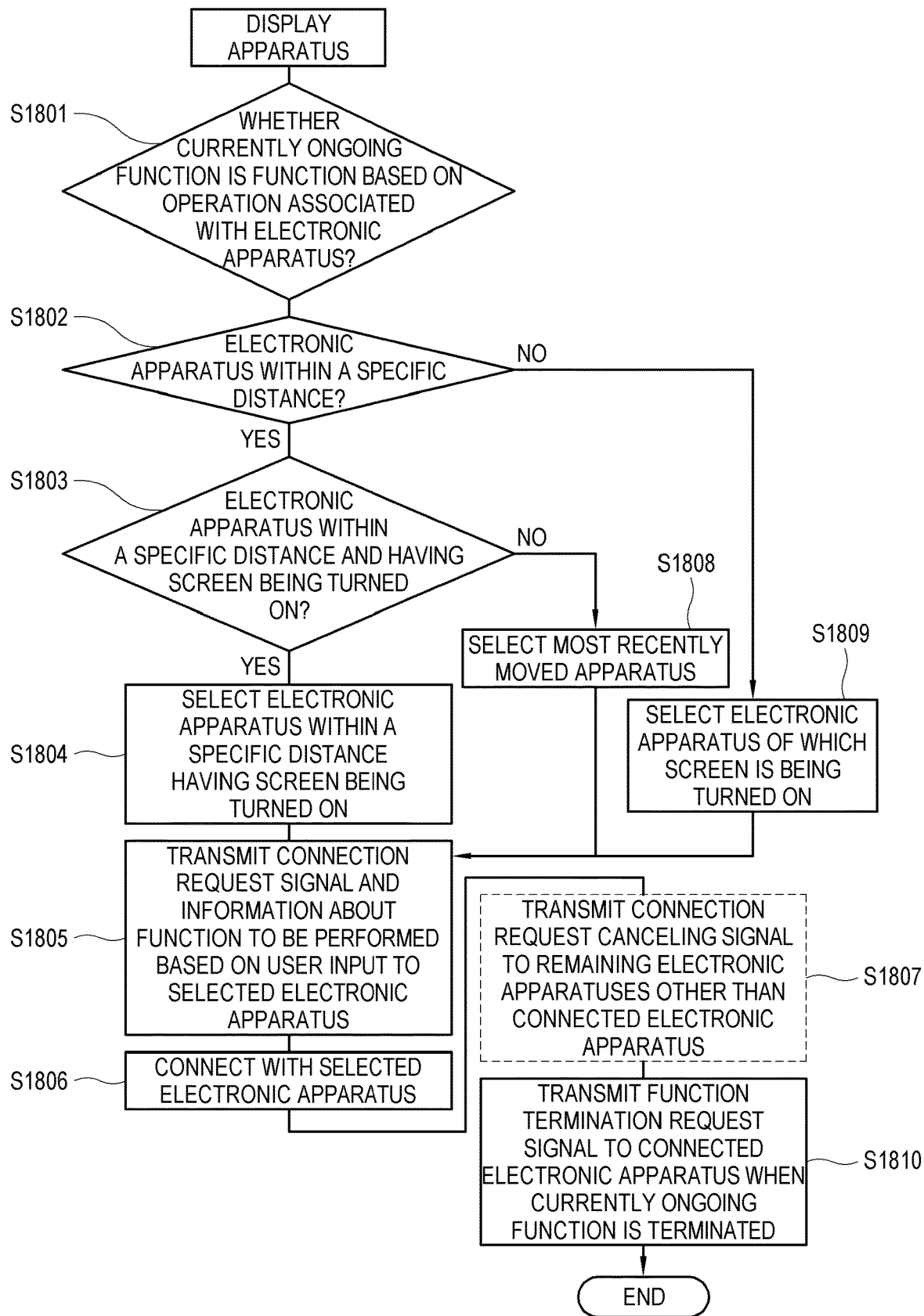
FIG. 19 is a flowchart illustrates another example where a display apparatus selects an electronic apparatus according to an embodiment of the disclosure.

Referring to FIG. 19, an example of selecting the electronic apparatus based on the information shown in FIG. 12 will be described below.

The processor 104 of the display apparatus 100 identifies whether a currently ongoing function performed by the display apparatus is a function related to or based on an operation associated with the electronic apparatus 200 (S1801). For example, when the display apparatus 100 is displaying a web browser including a search box and the search box is activated by the remote controller of the display apparatus 100, the processor 104 identifies the search box as a function of operating as associated with the electronic apparatus 200.

When the function being currently executed in the display apparatus 100 is identified as the function of operating as associated with or related to the electronic apparatus 200, the processor 104 identifies whether there is an electronic apparatus 200 within a predetermined distance (for example, 3 m), based on the information of FIG. 3 (S1802). When it is identified that the electronic apparatuses 200 are present within the predetermined distance (for example, 3 m), the processor 104 identifies whether there is an apparatus, of which a screen is being turned on, among the electronic apparatuses 200 (S1803). When it is identified that the electronic apparatus 200 is present having the turned-on screen, the processor 104 selects the electronic apparatus which is within a distance of 3 m from the display apparatus 100 and has a turned-on screen (S1084). Then, the processor 104 transmits the connection request signal and the information about the user input function to the selected electronic apparatus (S1805), and performs connection with the electronic apparatus 200 in which the connection request is accepted (S1806). According to an embodiment, when there are a plurality of electronic apparatuses 200 to which the connection request signal and the information about the user input function are transmitted, the processor 104 may carry out the connection with the electronic apparatus 200 that first accepts the connection request and transmit the connection request canceling signal to the remaining electronic apparatuses 200 other than the connected electronic apparatus 200 (S1807). According to an embodiment, the connection request signal and/or the information about the user input function are transmitted simultaneously to a plurality of electronic apparatuses 200. According to another embodiment, the connection request signal and/or the information about the user input function are transmitted in a sequence to a plurality of electronic apparatuses 200.

When it is identified that the electronic apparatuses 200 are present within the predetermined distance (for example 3 m), but there are no apparatuses having the turned-on screen among the electronic apparatuses 200, the processor 104 selects the most recently moved apparatus (S1808), transmits the connection request signal and the information about the user input function to the selected apparatus (S1805), and performs connection with the electronic apparatus 200 that accepts the connection request (S1806).

When it is identified that there are no electronic apparatuses 200 within the predetermined distance (for example 3 m), the processor 104 identifies the electronic apparatus of which the screen is being turned on (S1809), transmits the connection request signal and the information about the user input function to the identified apparatus (S1805), and performs connection with the electronic apparatus 200 that accepts the connection request (S1806).

The processor 104 of the display apparatus 100 connected to the electronic apparatus 200 selected by the foregoing operation identifies whether the function operating as associated with the electronic apparatus 200 is terminated as the function being currently executed in the display apparatus 100, and transmits a function termination request signal to the electronic apparatus 200 connected to the display apparatus 100 when the function is terminated (S1810).

Thus, reliability of selecting the electronic apparatus 200 is improved.

Meanwhile, as another example of the method of selecting the electronic apparatus 200 by the processor of the display apparatus 100 according to an embodiment of the disclosure, the processor 104 may identify a user and select an electronic apparatus 200 corresponding to the identified user. The electronic apparatus 200 being used by a user of the display apparatus 100 is one of potential candidates for the electronic apparatus 200 having a state suitable to receive a user input. Therefore, when a user who is currently using the display apparatus 100 is directly identifiable, the electronic apparatus 200 of the identified user is selected among the plurality of electronic apparatuses 200, thereby increasing likelihood of selecting the electronic apparatus 200 being currently used by the user of the display apparatus 100.

There may be various methods of identifying a user who is currently using the display apparatus 100.

For example, the processor 104 may identify a user based on login information to the display apparatus 100. In this regard, descriptions will be made with reference to FIG. 13.

While using the TV 100, a user may log in to the TV with the user's own account. For example, a user may log in to receive service customized or recommended for the user. When a certain user has already logged in to his/her account for the TV 100, it may be estimated that the certain user is currently watching the TV 100. Therefore, the electronic apparatus 200 corresponding to the logged-in user is selected among the plurality of electronic apparatuses 200, and the connection request is made to the electronic apparatus 200, thereby increasing the likelihood of making the connection request to the electronic apparatus 200 being used by the user of the display apparatus 100.

Figure 13:
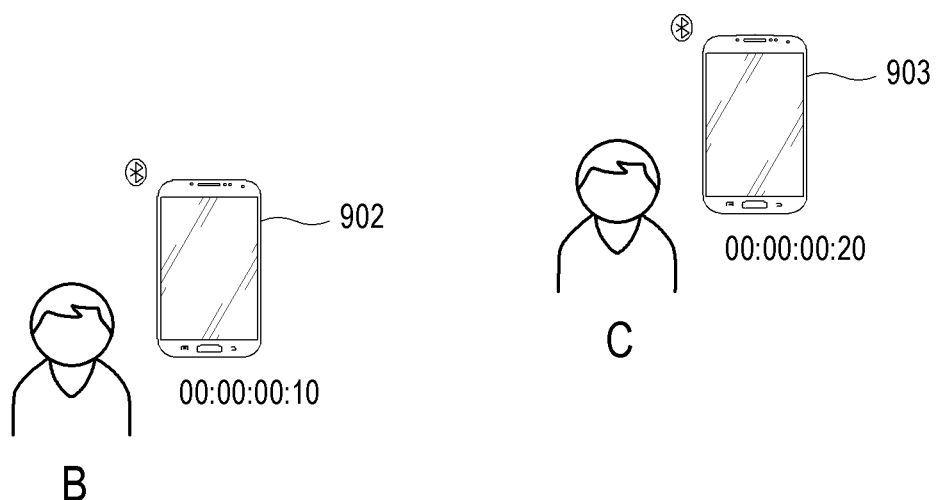
Figure 13:
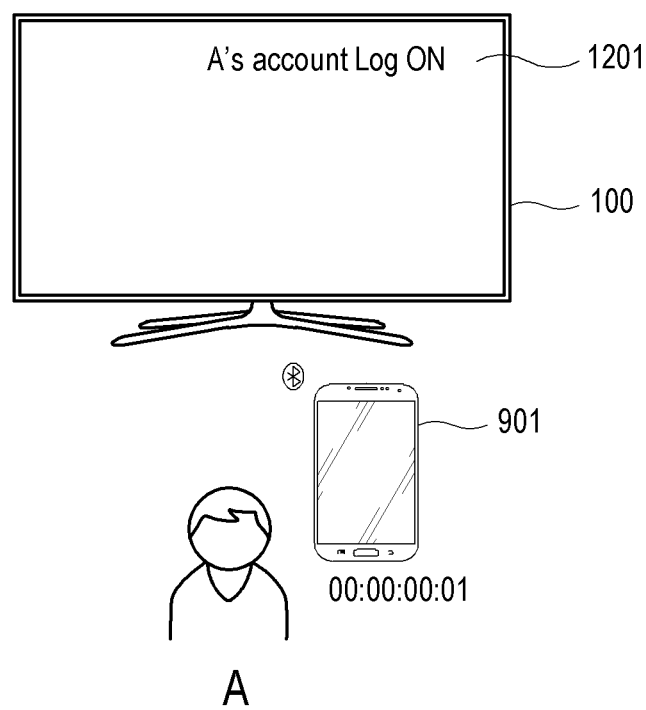

For example, as shown in FIG. 13, when the smartphones 901-903 of the users A to C are present around the TV 100, the processor 104 of the TV 100 first searches for peripheral apparatuses and then identifies that three electronic apparatuses respectively having identification numbers of 00:00:00:01, 00:00:00:10, and 00:00:00:20 are present around the TV 100. Further, the processor 104 identifies that the user A has already logged in the TV 100 with his/her account. Information that the user A has already logged in the TV 100 with his/her account may be displayed on the display 101 (1201), or may not be displayed.

Then, the processor 104 selects the electronic apparatus, to which the user A has logged in, among the searched electronic apparatuses 200, with reference to the DB including information about the electronic apparatus 200 such as the state information of the electronic apparatus 200, etc. for example, with reference to the DB shown in FIG. 12.

To make the processor 104 select the electronic apparatus 200, to which a user has logged in, among the plurality of electronic apparatuses 200 with reference to the DB including the information about the electronic apparatus 200, the DB including the information about the electronic apparatus 200 has to contain information about users in relation to the electronic apparatuses 200. In other words, like a column 1105 of users as shown in the table of FIG. 12, information about users respectively corresponding to the electronic apparatuses 200 needs to be included in the DB. The information about the users respectively corresponding to the electronic apparatuses 200 may be automatically generated by the processor 104, or may be generated based on a user input. For example, a user may access a server that manages user accounts and directly registers information about the electronic apparatus 200 being used by the user, so that user information can be generated corresponding to each electronic apparatus 200. Alternatively, when a user logs in to a user account through a certain electronic apparatus 200, the processor 104 automatically recognizes the corresponding electronic apparatus 200 as the electronic apparatus 200 of the user, and update the DB with the information.

Thus, reliability of selecting the electronic apparatus 200 is improved.

According to another embodiment, the method of identifying a user who is currently using the display apparatus 100 may include identifying a user when the user is using the remote controller. For example, a user may be identified based on his/her fingerprint information detected through the remote controller. However, the information detected by the remote controller is not limited to the fingerprint information, but may include another information, for example, a user's biometric information that can be used in identifying the user.

Figure 14:
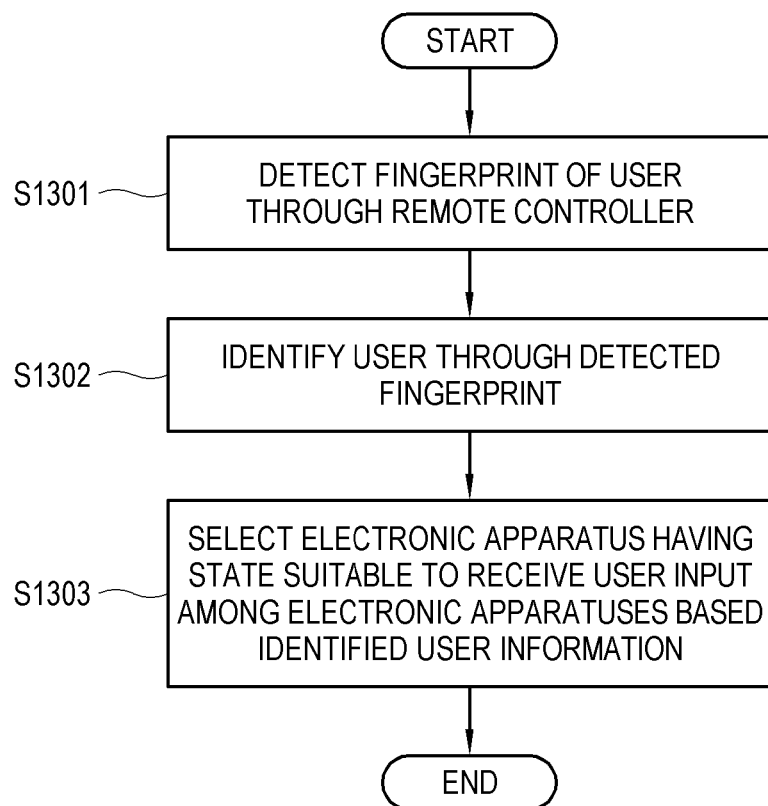

In this regard, descriptions will be made with reference to FIG. 14. The processor 104 of the display apparatus 100 receives a user's fingerprint information detected by the remote controller from the remote controller (S1301), and identifies the user based on the received fingerprint information (S1302). Based on the identified user information, the electronic apparatus 200 having a state suitable to receive a user input is selected among the plurality of electronic apparatuses 200 (S1303). As the method of selecting the electronic apparatus 200 based on the information about the identified user, a DB containing information about users respectively corresponding to the electronic apparatuses 200 may be used as described above.

Thus, it is possible to identify a user by a relatively simple method, and the electronic apparatus 200 is selected based on the information about the identified user the information, thereby improving reliability of selecting the electronic apparatus 200.

According to another embodiment, a method of identifying a user who is currently using the display apparatus 100 may further include an image capturer, so that the processor 104 can directly identify a user of the display apparatus 100 based on an image captured by the image capturer.

Figure 15:
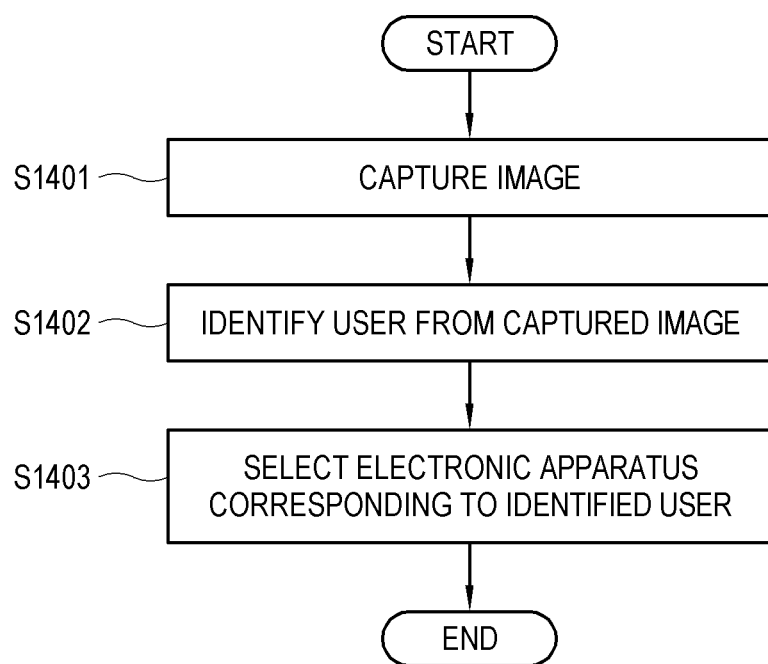

In this regard, descriptions will be made with reference to FIG. 15. The processor 104 of the display apparatus 100 controls the image capturer to capture an image (S1401), receives the captured image and identifies a user from the received image (S1402). Then, the processor 104 selects the electronic apparatus 200 corresponding to the identified user (S1403). As a method of selecting the electronic apparatus 200 based on information about the identified user, the DB including the information about the users respectively corresponding to the electronic apparatuses 200, or the like information may be utilized like that of the foregoing embodiment. According to the embodiment, the image capturer is a camera provided in the display apparatus 100. According to another embodiment, the image capturer is a camera provided separate from the display apparatus 100.

To identify a user from a captured image, various techniques may be used. For example, deep learning or machine learning using a support vector machine (SVM) algorithm, etc. may be used. In particular, a deep learning technique using a convolutional neural network (CNN) may be used. However, the identification method is not limited to this example, but may employ various image recognition techniques.

When the processor 104 identifies that a plurality of people are captured in a captured image as a result of schematically analyzing the captured image, it may be efficient to first identify a person who is likely to actually view the display apparatus 100 among the plurality of people and then accurately identify a user with respect to an area corresponding to the identified person rather than the whole area corresponding to all people. For example, the processor 104 preferentially analyzes only a face or eye direction of each person in the area corresponding to the person in the captured image, and then identifies whether there is an area where the face or eye direction is oriented toward the display apparatus 100, thereby accurately identifying a user with respect to only the corresponding area.

According to an embodiment, when there is the electronic apparatus 200 that has already been used for controlling the display apparatus 100 among the electronic apparatuses 200, for example, when a smartphone is executing a remote-control application capable of controlling a TV and controls the TV, the electronic apparatus 200 is regarded as the electronic apparatus that has already been connected to the display apparatus 100 and is being used by a user in controlling the display apparatus 100, and therefore the information about the function to be performed based on a user input is directly transmitted without the operation of separately selecting the electronic apparatus 200 and making the connection request, thereby receiving the user input from the electronic apparatus 200.

Figure 16:
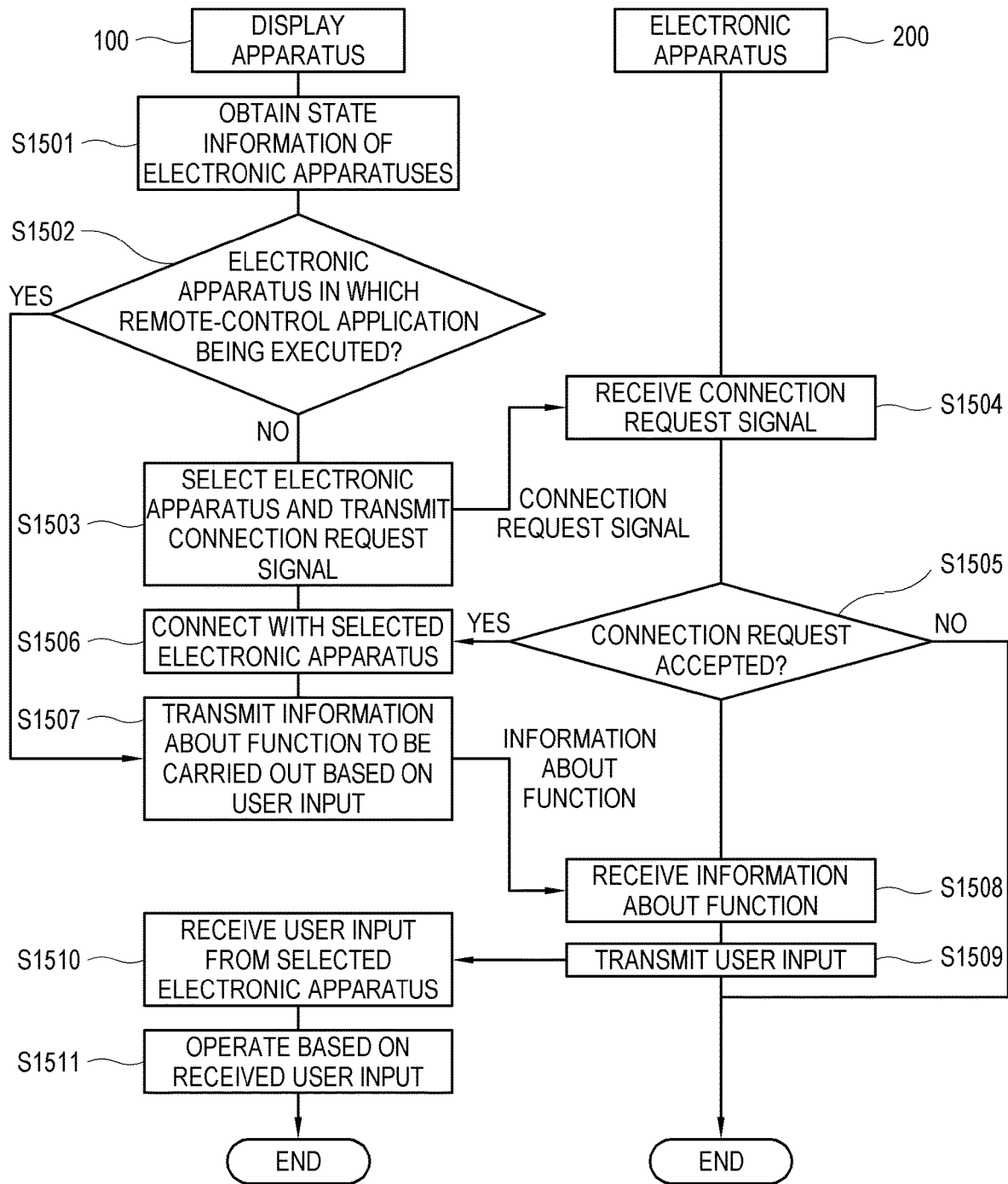

In this regard, descriptions will be made with reference to FIG. 16. According to this embodiment, the processor 104 of the display apparatus 100 obtains the state information of the plurality of electronic apparatuses 200 (S1501), and then identifies whether the electronic apparatus 200 executes the remote-control application (S1502). When there are no electronic apparatuses 200 in which the remote-control application is being executed, the processor 104 selects the electronic apparatus 200 as described above with reference to FIG. 3 and transmits the connection request signal to the selected electronic apparatus 200 (S1503), connects with the electronic apparatus 200 based on a connection request acceptance signal from the electronic apparatus 200 (S1506), transmits information about the function to be carried out based on a user input (S1507), and receives a user input through the electronic apparatus 200 (S1510). On the other hand, when there is the electronic apparatus 200 in which the remote-control application is being executed, the information about the function to be carried out based on a user input is directly transmitted without separately making the connection request because the electronic apparatus 200 and the display apparatus 100 have already been connected (S1507), and then the user input to the electronic apparatus 200 is received (S1510).

According to an embodiment, when there are no electronic apparatuses 200 in which the remote-control application is being executed, the processor 104 selects the electronic apparatus 200 as described above with reference to FIG. 3 and transmits the connection request signal to the selected electronic apparatus 200 (S1503). In response, the electronic apparatus 200 receives the connection request signal (S1504) and displays an UI item to receive an input from the user of the electronic apparatus 200. When it is identified based on reception of a user input with regard to the UI item that a user intends to accept the connection request signal (S1505), the processor 230 of the electronic apparatus 200 transmits a response of accepting the connection request to the display apparatus 100, and the processor 104 of the display apparatus 100 receives the response and performs connection with the selected electronic apparatus 200 (S1506).

Thereafter, the display apparatus 100 transmits information about the function to be carried out based on a user input (S1507). In response, the electronic apparatus 200 receives the information about the function (S1508), receives user input associates with the function and transmit the user input (S1509) to the display apparatus. The display apparatus 100 and receives a user input through the electronic apparatus 200 (S1510).

Thus, reliability and efficiency of selecting and connecting the electronic apparatus 200 are improved.

Figure 17:
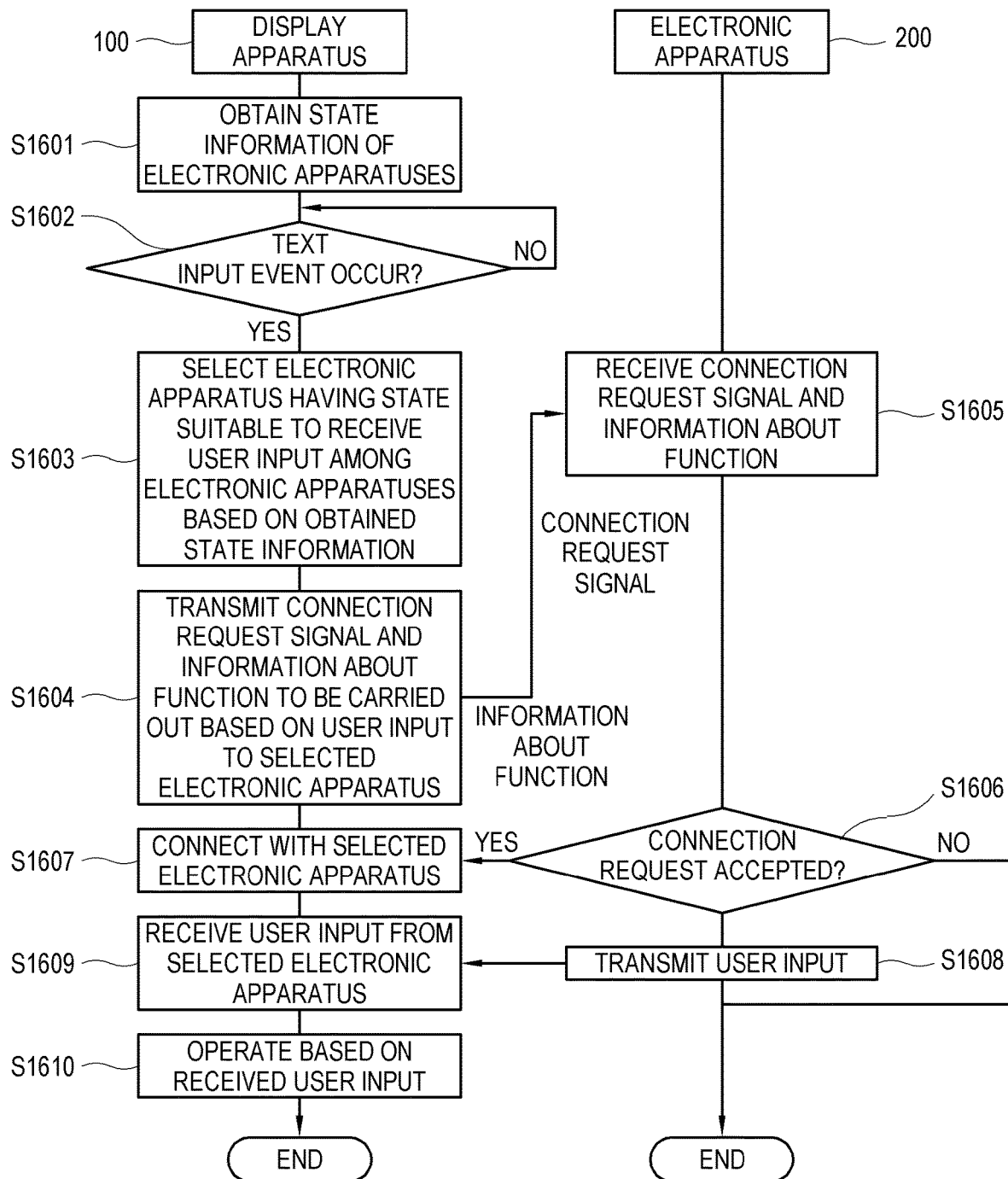
FIG. 17 is a flowchart showing an operation of a display apparatus according to another embodiment of the disclosure.

FIG. 17 is a flowchart showing operation of a display apparatus 100 according to another embodiment of the disclosure. In a state that the processor 104 of the display apparatus 100 obtains the state information of the plurality of electronic apparatuses 200, there are no limits to the method and time of selecting the electronic apparatus 200 having a state suitable to receive a user input among the plurality of electronic apparatuses 200. For example, the processor 104 of the display apparatus 100 may proceed with selecting the electronic apparatus 200 by receiving a user input that makes a request for selecting the electronic apparatus 200. Alternatively, the processor 104 may automatically proceed with selecting the electronic apparatus 200 based on detection of a text input event that requires a text input of a user occurs during operation of the display apparatus 100.

In this regard, the latter will be described with reference to FIG. 17. According to an embodiment, the processor 104 of the display apparatus 100 obtains the state information of the plurality of electronic apparatuses 200 (S1601), and identifies whether a text input event occurs or not (S1602). When the text input event does not occur, the processor 104 may wait for the occurrence of the text input event without moving to the next operation. When the occurrence of the text input event is detected by the processor 104, the processor 104 displays a UI including a text input box on the display, and receives a user input through the selected electronic apparatus 200 while displaying the UI. The operation following the operation of detecting the text input event is equivalent to those described with reference to FIG. 3 or 16.

For instance, when the occurrence of the text input event is detected by the processor 104, the processor 104 selects the electronic apparatus 200, which has a state suitable to receive a user input, among the plurality of electronic apparatuses 200 based on the obtained state information (S1603). When the processor 104 identifies that use of an external electronic apparatus 200 is necessary or provides a convenient interface to the user, based on a currently ongoing process of the display apparatus 100, the processor 104 transmits a connection request signal and information about a user input function to be carried out by the electronic apparatus 200 according to the currently ongoing process to the selected electronic apparatus 200 through the communicator 102 (S1604).

When the processor 104 of the display apparatus 100 transmits the connection request signal and the information of the user input function based on the current process, the processor 230 of the corresponding electronic apparatus 200 receives the connection request signal and the information about the function (S1605) and outputs a UI for receiving a user input of accepting the connection request. When it is identified based on reception of a user input with regard to the UI item that a user intends to accept the connection request signal (S1606), the processor 230 of the electronic apparatus 200 transmits a response of accepting the connection request to the display apparatus 100, and the processor 104 of the display apparatus 100 receives the response and performs connection with the selected electronic apparatus 200 (S1607).

When the display apparatus 100 and the electronic apparatus 200 are connected through the foregoing process, the processor 230 of the electronic apparatus 200 displays a graphic screen for receiving a user input on the display 210 of the electronic apparatus 200 based on received information about the function, and transmits a user input (S1608), which is received from a user based on the displayed graphic screen, to the display apparatus 100 and the display apparatus receives the user input from the selected electronic apparatus 200 (S1609). Accordingly, the display apparatus operates a function based on the received user input (S1610).

Thus, at a point in time when a user will need connection with the electronic apparatus 200, the connection of the electronic apparatus 200 to the display apparatus 100 is requested to thereby receive a user input.

Further, when an event that makes the display apparatus 100 transmit the connection request signal to the electronic apparatus 200 (for example, the text input event) is terminated, the processor 104 of the display apparatus 100 according to an embodiment may transmit the connection request canceling signal to the electronic apparatus to which the connection request signal is transmitted. Here, as an example of the event for making the connection request signal be output is terminated, the search box may be activated through the remote controller of the display apparatus 100 and then inactivated again by selection in the remote controller in the state that the display apparatus 100 displays the web browser including the search box as described above with reference to FIG. 3.

Figure 18:
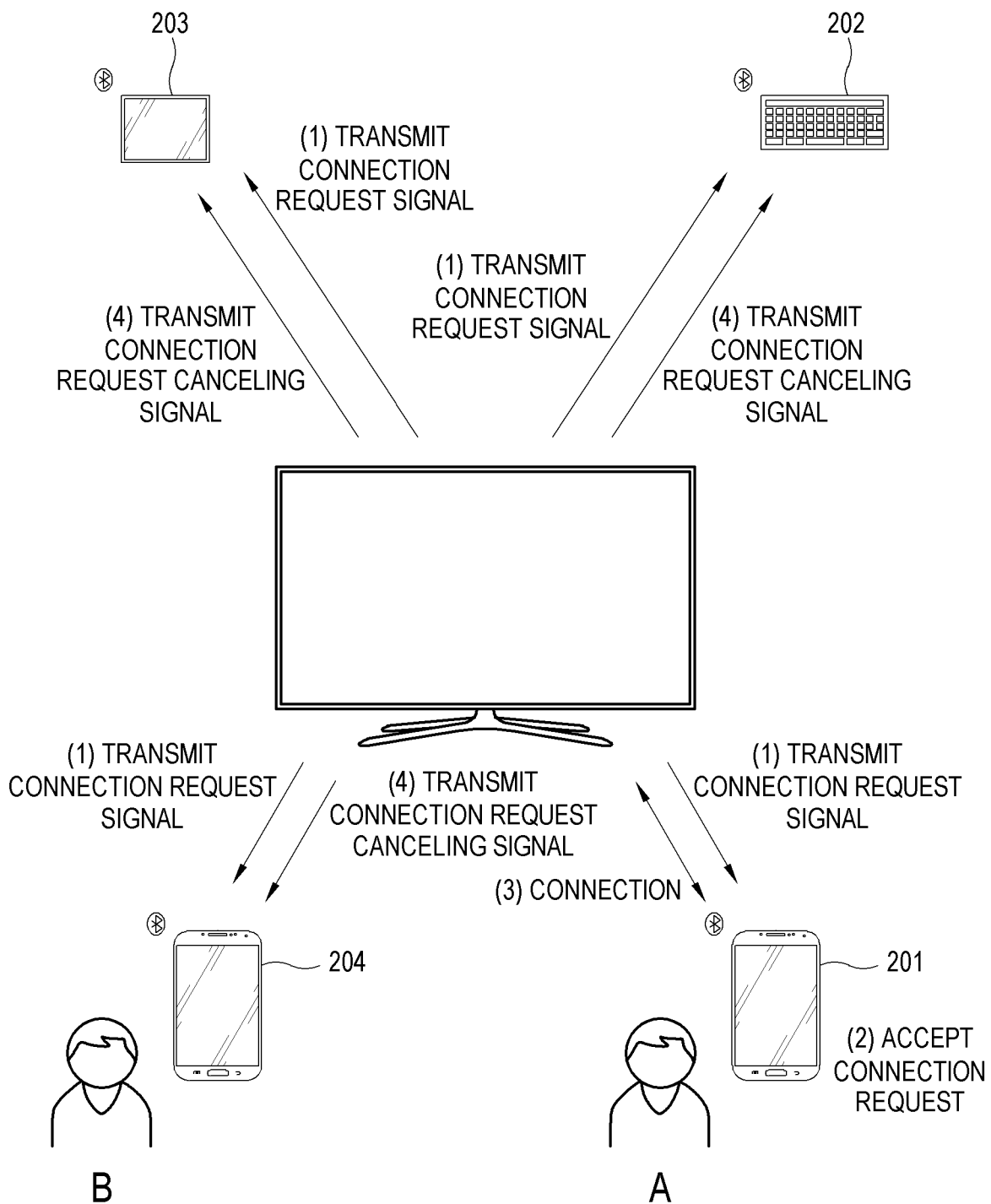
FIG. 18 is an illustration showing an operation of a display apparatus according to still another embodiment of the disclosure.

FIG. 18 shows operation of a display apparatus 100 according to still another embodiment of the disclosure. In this embodiment, the processor 104 of the display apparatus 100 selects the plurality of electronic apparatuses 200, transmits the connection request signal to the electronic apparatuses 200, and transmits the connection request canceling signal to the electronic apparatuses 200 except the connected electronic apparatus 200 among the plurality of selected electronic apparatuses 200. In other words, after the plurality of electronic apparatuses 200 is selected and the signal for requesting the connection with the display apparatus 100 is transmitted to the selected electronic apparatuses 200, when one of the selected electronic apparatuses 200 accepts the connection request and connects with the display apparatus 100, the request for the connection to the remaining electronic apparatuses 200 other than the connected electronic apparatus 100 is not needed anymore, and therefore the signal for canceling the request is transmitted to the remaining electronic apparatuses 200, thereby preventing unnecessary information from being transmitted to the electronic apparatus 200.

For example, as shown in FIG. 18, in a case where a smartphone 201 of a user A, a Bluetooth keyboard 202, a tablet computer 203, and a smartphone 204 of a user B are present as a plurality of electronic apparatuses 200 around the TV 100, the processor 104 select one electronic apparatus 201 among the plurality of electronic apparatuses 200, transmits the connection request signal and at the same time transmits the connection request signal to at least some electronic apparatuses 202, 203 and 204 among the plurality of electronic apparatuses, i.e. transmits the connection request signal to many electronic apparatuses, thereby coping with an error in selecting the electronic apparatus 200 (see (1) of FIG. 18). Then, when the electronic apparatus 201 receiving the connection request signal accepts the connection request and is thus connected to the display apparatus 100 (see (2) and (3) of FIG. 18), the processor 104 transmits the connection request canceling signal to the remaining electronic apparatus 202, 203 and 204 other than the connected electronic apparatus 201 (see (see (4) of FIG. 18).

Thus, the connection request, which is not valid any more, is prevented from being displayed on the electronic apparatus 200, thereby preventing a user from being disoriented using the electronic apparatus 200.

As described above, according to the disclosure, even though many electronic apparatuses are present around the display apparatus, it is possible to make a request for connection to an electronic apparatus suitable to receive a user input among many electronic apparatuses.

According to an aspect of the disclosure, even though there are a plurality of electronic apparatuses around the display apparatus of the disclosure, the display apparatus can automatically select and make the connection request to the electronic apparatus suitable to receive a user input, so that a user can immediately make an input for the display apparatus through the electronic apparatus without undergoing cumbersome connection procedures. Further, during a process of connecting the display apparatus and the electronic apparatus, the user input together with information about a function to be performed in the electronic apparatus is transmitted to the electronic apparatus, so that the function needed after the connection with the display apparatus can be immediately executed in the electronic apparatus, thereby providing improved convenience to the user.

According to an aspect of the disclosure, movement information indicating whether the electronic apparatus has moved or how long or how much the electronic apparatus has moved is used, thereby improving reliability in selecting the electronic apparatus.

According to an aspect of the disclosure, the connection of the electronic apparatus to the display apparatus is requested to thereby receive a user input at a point in time when a user will need connection with the electronic apparatus.

According to an aspect of the disclosure, the connection request, which is not valid any more, is prevented from being displayed on the electronic apparatus, thereby preventing a user from being confused using the electronic apparatus.

According to an aspect of the disclosure, it is possible to automatically make a request for connection to an electronic apparatus suitable to receive a user input among many electronic apparatuses even though many electronic apparatuses are present around a display apparatus.

Although a few embodiments have been shown and described, it will be appreciated by those skilled in the art that changes may be made in these embodiments without departing from the principles and spirit of the invention, the scope of which is defined in the appended claims and their equivalents.

What is claimed is:

1. A display apparatus comprising:
a display;
a communicator;
a storage; and
a processor configured to:
in response to an occurrence of an event corresponding to a user input, identify a plurality of first electronic apparatuses which is connectable through the communicator,
obtain state information about a state of each of the identified plurality of first electronic apparatuses,
select a plurality of second electronic apparatuses, among the identified plurality of first electronic apparatuses, based on the obtained state information of the plurality of electronic apparatuses satisfying a predetermined criteria
transmit a connection request signal to each of the plurality of second electronic apparatuses through the communicator along with information about a function to be performed by the display apparatus based on the user input,
receive a response associated with the connection request signal from an electronic apparatus which accepts the connection request signal, among the plurality of second electronic apparatuses,
connect, through the communicator, with the electronic apparatus, which responded to the connection request signal, and transmit a connection request canceling signal through the communicator to each of remaining electronic apparatuses other than the connected electronic apparatus among the plurality of second electronic apparatuses,
receive a user input from the connected electronic apparatus through the communicator, and
execute the function based on the received user input.

2. The display apparatus according to claim 1, wherein the predetermined criteria comprises one of an apparatus currently used by a user of the display apparatus or an apparatus which is close to the user.

3. The display apparatus according to claim 2, wherein the state information further comprises time information indicating the time or a duration related to movement of the identified one or more electronic apparatuses detected by a sensor of the one or more electronic apparatuses.

4. The display apparatus according to claim 1, wherein the state information further comprises an operation state of a screen in the identified one or more electronic apparatuses.

5. The display apparatus according to claim 1, wherein the processor is configured to identify a distance of each of the plurality of second electronic apparatuses, based on strength of a signal received from the plurality of second electronic apparatuses through the communicator and information included in the signal.

6. The display apparatus according to claim 1, wherein the processor is configured to identify a user, and select the connected electronic apparatus corresponding to the identified user.

7. The display apparatus according to claim 6, wherein the processor is configured to identify the user based on login information to the display apparatus.

8. The display apparatus according to claim 6, wherein the processor is configured to identify the user based on a captured image.

9. The display apparatus according to claim 1, wherein the processor is further configured to display a user interface (UI) comprising a text input box on the display, and receive the user input from the connected electronic apparatus while displaying the UI.

10. The display apparatus according to claim 1, further comprising a second communicator configured to communicate with a server,
wherein the processor is configured to obtain the state information of each of the identified one or more electronic apparatuses from the server through the second communicator.

11. The display apparatus according to claim 1, wherein the processor is further configured to transmit a function termination request signal to the connected electronic apparatus in response to the function being terminated.

12. The display apparatus according to claim 1, wherein the connection request canceling signal is transmitted to each of the remaining electronic apparatuses after the connected electronic apparatus accepted the connection request signal.

13. An electronic apparatus comprising:
a display;
a communicator; and
a processor configured to:
receive a connection request signal from a display apparatus along with information about a function to be performed by the display apparatus based on a user input,
receive, through an user interface of the electronic apparatus, a user input accepting a connection request,
display a screen based on the received information about the function on the display, and
receive the user input based on the displayed screen and transmit the user input to the display apparatus,
wherein the electronic apparatus is selected, from among one or more electronic apparatuses, based on movement state information indicating a time when one or more the electronic apparatuses corresponding to the display apparatus moved, and wherein the electronic apparatus is the most recently moved electronic apparatus after a determination that the first electronic apparatus is within a specific distance and the electronic apparatus does not have a turned-on screen prior to the connection request signal from the display apparatus.

14. The electronic apparatus according to claim 13, wherein the processor is further configured to transmit the state information of the electronic apparatus to the display apparatus or a server.

15. The electronic apparatus according to claim 13, wherein the processor is further configured to display a screen on the display based on the received information about the function while the electronic apparatus is in a locked.

16. A method of controlling a display apparatus, comprising:

in response to an occurrence of an event corresponding to a user input, identify a plurality of first electronic apparatuses which is connectable through a communicator of the display apparatus, obtaining state information about a state of each of the identified plurality of first electronic apparatuses;

selecting a plurality of second electronic apparatuses, among the identified one or more electronic apparatuses, based on the obtained state information of the plurality of first electronic apparatuses satisfying a predetermined criteria;

transmitting a connection request signal to each of the plurality of second electronic apparatuses through the communicator along with information about a function to be performed by the display apparatus based on the user input;

receiving a response associated with the connection request signal from an electronic apparatus which accepts the connection request signal, among the plurality of second electronic apparatuses, connecting, through the communicator, with the electronic apparatus, which responded to the connection request signal among the plurality of electronic apparatuses, and transmitting a connection request canceling signal through the communicator to each of remaining electronic apparatuses other than the connected electronic apparatus among the second plurality of electronic apparatuses;

receive a user input from the connected electronic apparatus through the communicator; and executing the function based on the received user input.

17. The method according to claim 16, wherein the state information comprises an operation state of a screen in the identified one or more electronic apparatuses.

18. A method of controlling an electronic apparatus, comprising:

receiving a connection request signal from a display apparatus along with information about a function to be performed by the display apparatus based on a user input;

receiving a user input accepting a connection request through an user interface of the electronic apparatus;

displaying a screen based on the received information about the function on the display; and receiving the user input based on the displayed screen and transmit the user input to the display apparatus, wherein the electronic apparatus is selected, from among one or more electronic apparatuses, based on movement state information indicating a time when the one or more electronic apparatuses corresponding to the display apparatus moved, and wherein the electronic apparatus is the most recently moved electronic apparatus after a determination that the first electronic apparatus is within a specific distance and the electronic apparatus does not have a turned-on screen prior to the connection request signal from the display apparatus.

\* \* \* \* \*